United States Patent
Tanriover et al.

(10) Patent No.: US 12,260,284 B2
(45) Date of Patent: Mar. 25, 2025

(54) PROBABILISTIC CONTEXTUAL INFERENCE USING RFID TAG-INTERACTIONS

(71) Applicant: Intel Corporation, Santa Clara, CA (US)

(72) Inventors: Cagri Tanriover, Portland, OR (US); Rahul C. Shah, San Francisco, CA (US); Chieh-Yih Wan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 17/124,091

(22) Filed: Dec. 16, 2020

(65) Prior Publication Data

US 2021/0103708 A1 Apr. 8, 2021

(51) Int. Cl.
*G06K 7/10* (2006.01)
*G06K 7/00* (2006.01)
*G06N 7/01* (2023.01)

(52) U.S. Cl.
CPC ........... *G06K 7/10366* (2013.01); *G06K 7/00* (2013.01); *G06N 7/01* (2023.01)

(58) Field of Classification Search
CPC ........... G06K 7/10366; G06K 7/10297; G06K 7/10009; G06N 7/01; G06Q 10/087
See application file for complete search history.

(56) References Cited

U.S. PATENT DOCUMENTS

| | | | |
|---|---|---|---|
| 9,959,494 B1 * | 5/2018 | Shyamkumar | G06Q 10/087 |
| 10,832,024 B2 | 11/2020 | Wan et al. | |
| 2006/0022815 A1 * | 2/2006 | Fischer | G06K 7/10356 340/505 |
| 2006/0092040 A1 * | 5/2006 | Fishkin | G06K 17/00 340/539.13 |
| 2009/0021376 A1 * | 1/2009 | Calvarese | G06Q 10/00 340/572.1 |
| 2020/0117863 A1 * | 4/2020 | Ha | G06K 19/07771 |

\* cited by examiner

*Primary Examiner* — Mohamed Barakat
*Assistant Examiner* — Rufus C Point
(74) *Attorney, Agent, or Firm* — Banner & Witcoff Ltd.

(57) ABSTRACT

Techniques are disclosed for performing RFID motion tracking in an intelligent manner that facilitates the generation of accurate and useful metrics for marketing and other applications. The techniques function to reduce problematic false positive rates on RFID tags attached to items to improve the accuracy of the motion presence of a small subset of browsed items among a much larger set of tagged items in the same space. This accurate motion inference enables the calculation of metrics such as customer-item interaction duration, pauses in interactions (potentially indicating close examining), and the extraction of patterns of motion that can indicate interest leading to realized sales, as well as concurrent motion detection of multiple items indicating which related items shall be placed in close proximity to increase sales of matching items.

24 Claims, 10 Drawing Sheets

PROBABILISTIC CONTEXTUAL INFERENCE USING RFID TAG-INTERACTIONS

TECHNICAL FIELD

Aspects described herein generally relate to techniques implementing probabilistic contextual inference to determine human interactions with products via analysis of radio frequency identification (RFID) tag data.

BACKGROUND

RFID technology has conventionally been used for applications such as inventory tracking.

However, using existing RFID hardware to extract customer-item interaction data, as well as browsing and in-store traffic, is becoming an attractive feature in terms of return on investment (ROI). Using phase and received signal strength information (e.g. receive strength signal indicator (RSSI)) from RFID tags for extracting customer-item interaction analytics is becoming a key differentiator for brick-and-mortar stores. However, the reliable detection of a few moving RFID tags (due to customer browsing and interaction) among thousands of static RFID tags in an environment while maintaining low false positive rates to provide accurate data, remains an open problem.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
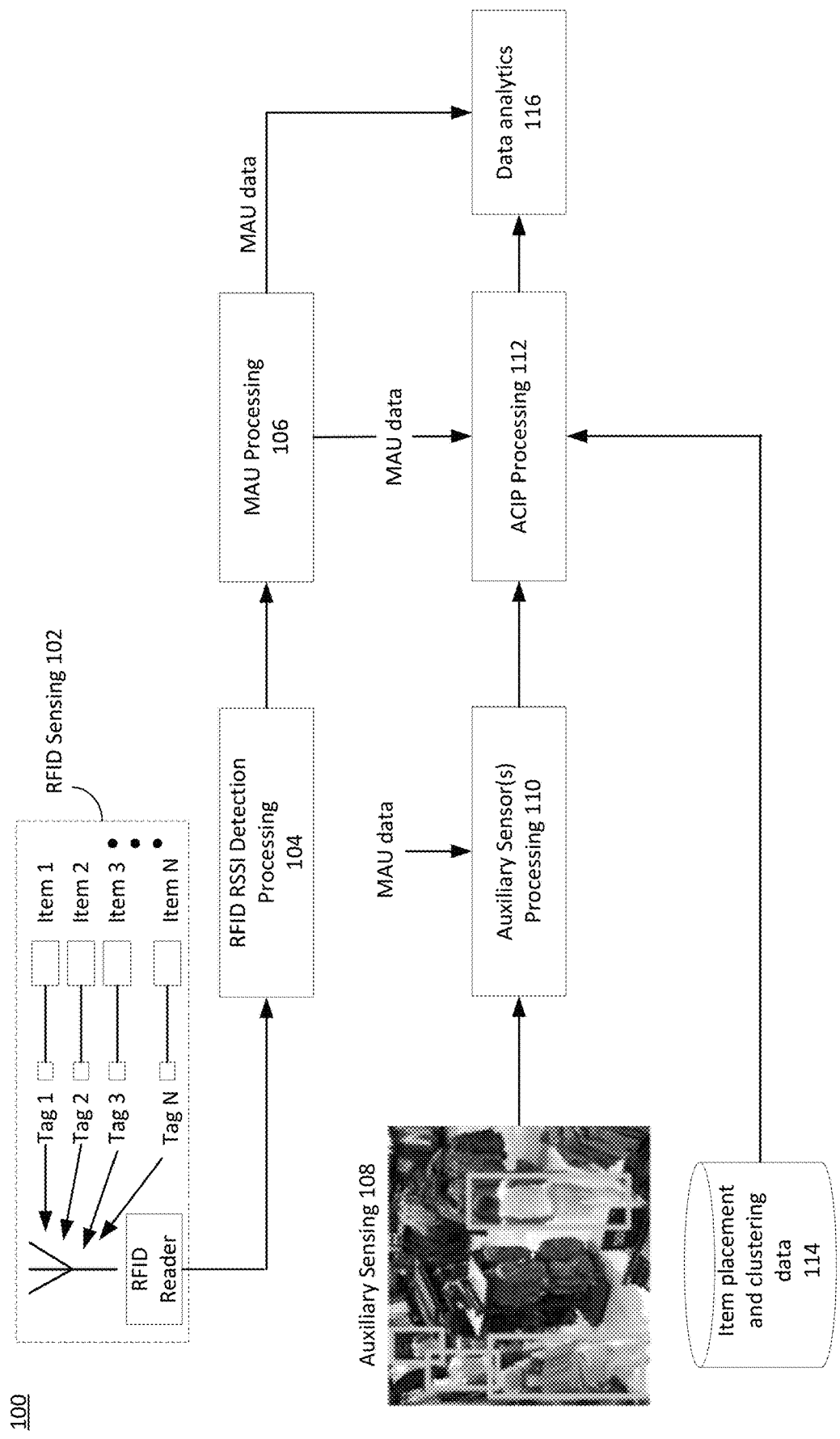
FIG. 1 illustrates an example system for generating analytic datasets based upon RFID tagged item motion tracking, in accordance with one or more aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, reliably detecting a subset of moving RFID tags among a much larger set while maintaining a low false positive rate remains an issue. For instance, due to the transceiver channel dynamics and the limited bandwidth of commercial RFID readers, issues encountered such as sample gaps, RF interference, multipath, and shadowing effects increase the level of uncertainty at the inference stage (e.g. identifying if detected RFID tag motion is the result of human-item interaction), which causes an increased rate of false positives. Thus, current solutions and applications involving object tracking include "just walk out" shopping experiences, in which items picked up by a shopper are detected, as well as a shopper replacing such items for identification for purchasing.

Such existing solutions, however, use a complex and expensive solution that relies upon optical detection and tracking as well as weight-based sensors installed in the store shelves. Thus, such applications require that an exact weight of each item placed on the shelves is known. Moreover, installed cameras are typically used for object tracking, which relies upon the movement of the shoppers between the field of view of those cameras. As a result, the cameras need to be oriented manually during installation to ensure the full shop floor is covered and that continuous shopper tracking can be achieved with high accuracy. This process is time consuming, however, and may require trial and error to reach the desired coverage. In such implementations, a high level of redundancy is also required such that the system continues to function even if a few cameras malfunction, further increasing complexity and cost.

Furthermore, because of the nature of just walk out applications, such systems are designed to achieve nearly 100% accuracy in billing, which is done in exchange of the high cost of hardware and deployment as discussed above. However, such systems are unsuitable to provide a cost-effective means for other applications that focus instead on understanding customer browsing habits in a less constrained environment. For example, the stocking setup in a retail store may be determined or metrics derived such as footfall, which do not require the same level of accuracy as just walk out applications to provide critical insight value for retail-workflow optimization.

Still further, current just walk out applications also suffer from disadvantages making them unsuitable for deriving metrics for marketing purposes. For instance, just walk out applications lack the ability to perform continuous tracking, as the motion of a picked-up item, once removed from the shelf, is not monitored. Such applications also do not use RFID for inventory tracking and sensing. Finally, just walk out systems do not provide full customer behavior analytics, as they fail to track any shopper/item interaction (besides the item being picked up or replaced), and do not provide shopper browsing analytics.

Thus, to address these issues, the aspects described herein perform RFID motion tracking in an intelligent manner that facilitates the generation of accurate and useful metrics for marketing and other applications. For instance, if it is determined that detected RFID tag motion is the result of a customer handling and/or carrying an item associated with the RFID tag, then such determinations may be used to build various metrics over time that allow the frequency, flow, and patterns of customers interacting with stocked items (e.g. in a retail environment) to be determined. This information, when accurately portrayed using RFID motion tracking, may be particularly useful for marketing purposes as this lends insight into how customers browse, the locations of best-selling items, the relationship between the placement and location of those items in a particular retail store environment, etc.

To achieve this, the aspects described herein function to reduce problematic false positive rates on RFID tags attached to items (e.g. in retail stores) to improve the accuracy of the motion presence of a small subset of browsed items among a much larger set of (e.g. thousands) of tagged items in the same space. Accurate motion inference, in turn, enables the calculation of metrics such as customer-item interaction duration, pauses in interactions (potentially indicating close examining), and the extraction of patterns of motion that can indicate interest leading to realized sales, concurrent motion detection of multiple items indicating which related items shall be placed in close proximity to increase sales of matching items, etc.

In other words, by using contextual information (e.g. absolute and relative position of items, people, traffic, etc.) to provide additional estimations, the number of raw RFID based false positive (i.e. RFID detected motion not due to human-item interaction) can be reduced, thereby improving the overall accuracy of RFID tag-motion inference provided to the analytical platform. From a hardware perspective, the aspects described herein may address this using only a few components such as a single reader and a single antenna, as well as a customized computing platform to analyze the RFID tag data resulting from tag reads. With such a setup, it is possible to make inferences on a larger number (e.g., 1000 RFID tags or more) occupying a shelf-oriented retail space.

To do so, the aspects described herein implement the use of a motion confidence level metric, which may be referred to herein as a Metric Augmentation Unit (MAU), an MAU motion confidence level metric, or simply as a motion confidence level metric. As further discussed below, the MAU motion confidence level metric provides a confidence level that functions to identify a level of confidence with respect to identifying which RFID tags actually in motion (e.g. due to human-item). This metric may function as an initial "gateway" or filter to indicate an initial set of RFID tags having a higher probability of being subjected to motion. Therefore, depending on the motion confidence levels of multiple tags (e.g. when the MAU predetermined threshold is exceeded or when other conditions are met as discussed in further detail below), additional processing may be performed by an Aggregated Contextual Inference Platform (ACIP).

The aspects described herein use the ACIP to provide additional information based on wireless measurements in monitored environments that use a known placement of RFID-tagged items in various configurations within that environment (e.g. a retail space or shop floor). The ACIP optionally uses other sources of sensor data measurements, such as visual information provided by surveillance cameras, for instance, as additional contextual information. Although explained herein in the context of a retail environment, this is by way of example and not limitation. The aspects described herein may be used in any suitable environment in which accurate and reliable motion tracking of items is desired, such as in the food, textile, and other suitable industries and/or manufacturing environments in which human interaction with tools, parts, machines, etc., are ubiquitous. Moreover, the aspects described herein use RFID tracking by way of example and not limitation, and the aspects described herein may be extended to include motion tracking using RSSI values or other suitable metrics related to signal strength measurements for any suitable type of wireless devices, wireless transmissions, and/or wireless protocols.

FIG. 1 illustrates an example system for generating analytic datasets based upon RFID tagged item motion tracking, in accordance with one or more aspects of the present disclosure. As shown in FIG. 1, the system 100 includes an RFID sensing system 102, which may be identified with a particular monitored environment (e.g. a retail shop floor) that is stocked with any suitable number N of items. Each of the items may be physically coupled to a respective RFID tag. The RFID tags as discussed herein may be implemented as any suitable type of RFID tag, including passive and active RFID tag types. The RFID reader as shown in FIG. 1 may periodically communicate with the RFID tags within the monitored environment, which may include sweeping through various regions depending upon the size of the space that is monitored, and may be the result of mechanical and/or electrical antenna beam steering, for instance. Although a single reader and antenna are illustrated, this is by way of example and not limitation, and the aspects may include any suitable number of RFID readers and/or antennas to facilitate reading each RFID tag within a monitored region over the course of a particular sampling period (e.g. during hours when the retailer is open for business).

Figure 2:
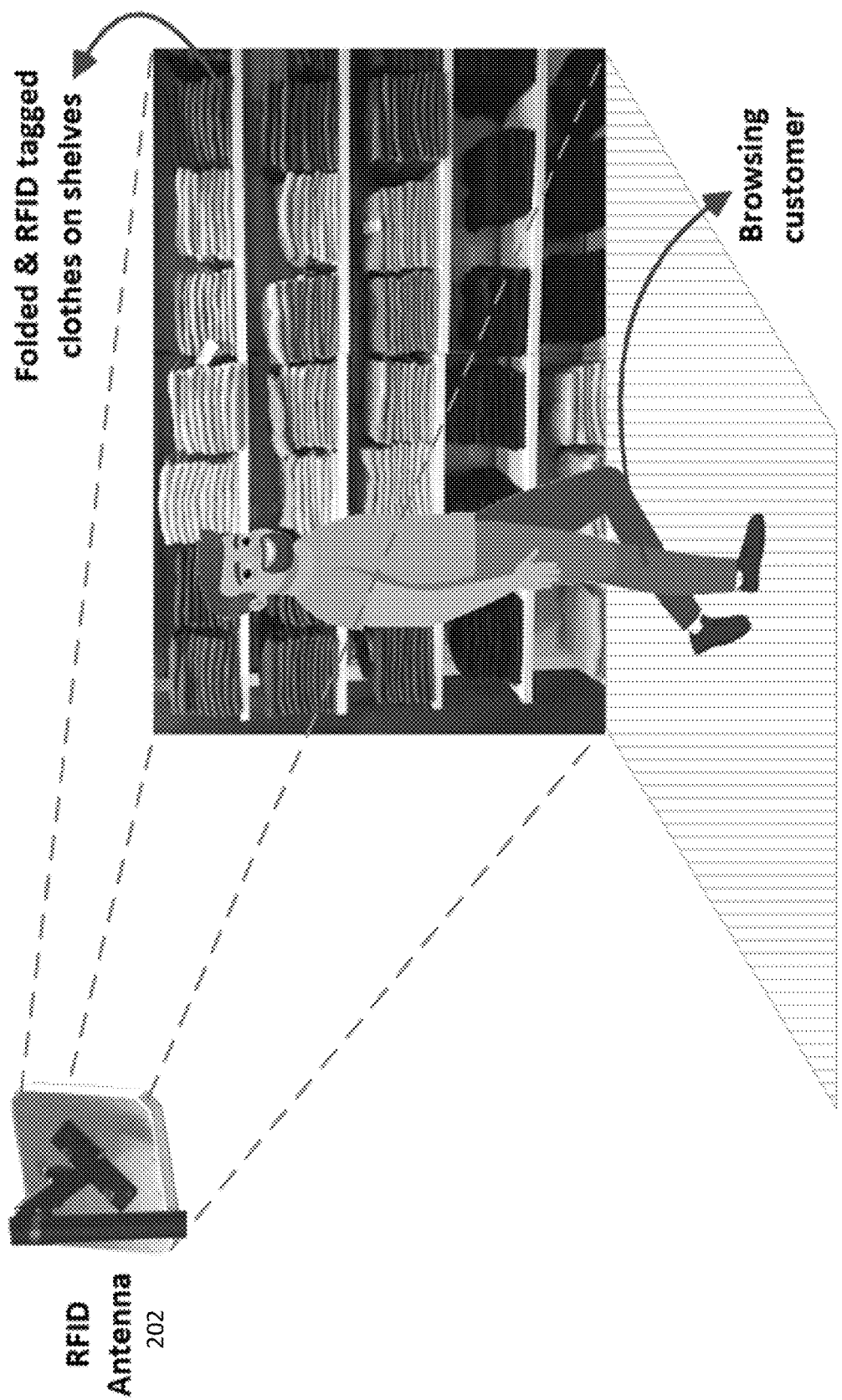
FIG. 2 illustrates an example usage scenario for tracking RFID tag motion in a monitored environment, in accordance with one or more aspects of the present disclosure.

An example of an RFID antenna 202 and at least a portion of the monitored environment is shown in further detail in FIG. 2 as the RFID monitored environment 200. The RFID monitored environment 200 includes, in this example, several shelves of clothing that may be identified with the items as shown in FIG. 1. In this example, the RFID monitored environment 200 corresponds to a location within a retail store, with each item of clothing including an attached RFID tag that is monitored as shown in FIG. 1 via the RFID sensing system 102. This shelf arrangement of items is often preferred by retailers, as it provides an effective visual means to guide customers for increasing the likelihood of purchasing items on display. In the example scenario shown in FIG. 2, the RFID antenna 202 covers the entire shelf unit filled with items (and may cover additional shelves or regions), each of which have an RFID tag attached with a unique identification (ID) number. This arrangement is used as an example throughout the disclosure, but again is by way of example and not limitation, as the aspects described herein may be directed to other monitored environments besides retail, and may include monitoring any suitable size region and in any suitable type of environment. For example, although clothing placed on shelves is used as an example throughout the disclosure, the aspects may include items arranged in other ways such as hangers, pallets, bins, etc.

The RFID antenna 202 is often attached to the ceiling above the customer and the shelf unit at an effective read distance (e.g. 3 to 5 meters). The customer is free to roam around in front of the shelf unit to pick up items, to move them around freely while browsing, and replace them on the shelf when done. The customer may also visually inspect items without physically touching them. The most common area of motion for the customer falls somewhere between the RFID antenna 202 and the shelf unit.

Referring now back to FIG. 1, the system 100 includes several processing blocks used to implement the calculation of various metrics and/or analytical datasets based upon detected RFID tag movement, as discussed in further detail below. These processing blocks are provided by way of example and ease of explanation, and may be identified with any suitable number and type of components used to perform the processing operations as discussed herein. The system 100 also include arrows interconnecting the various processing blocks. The arrows shown in FIG. 1 may thus represent respective data interfaces communicatively coupling the various hardware components of the system 100 (e.g. the components implemented to provide the associated functionality). For example, a data interface may be coupled between the RFID RSSI detection processing block 104 and the MAU processing block 106 to facilitate the MAU calculations using the RSSI values. The data interfaces shown in FIG. 1 may represent any suitable type and/or number of wired and/or wireless links, which may implement any suitable type and/or number of communication protocols. Additionally or alternatively, the arrows shown in FIG. 1 may represent the flow of data more generally, and thus represent a transfer of data via software, memory buffers, etc., within a memory or within the same component. The functionality discussed with reference to the processing blocks shown in FIG. 1 is also provided by way of example. For instance, the processing blocks as shown and discussed with reference to FIG. 1 may represent one or more processors or other suitable components identified with the same component (e.g. a computer, server, mobile device, etc.) or with one or more separate components.

In an aspect, the RFID reader may receive data from each of the monitored RFID tags within the monitored environment. This may include, for example, for each backscatter signal received from each respective RFID tag, data from which RSSI values may be measured, the unique RFID tag ID that may include a string of digits, text, etc. The location and display arrangement of the items associated with the RFID tags, each of which has its own unique RFID tag ID, may be stored or otherwise known as part of an inventory management database, which is typically maintained as part of an IT system managed by the retailer, manufacturer, etc. Such information may be stored in the item placement and clustering data storage 114, for example, or in any other suitable location that may not be shown in FIG. 1, in various aspects.

The item placement and clustering data storage 114 may store RFID tag IDs and corresponding item information, as well various details of the physical placement, location, etc. of those items within the monitored environment, each being correlated to the RFID tag ID. The specific level of detail regarding the location and placement of the items associated with the RFID tags within a monitored environment may be chosen based upon the particular application and/or granularity of information that is desired, in various aspects. For example, the arrangement of items need not be (but could be) at a fine level detail such as "shirt with RFID tag ID X is on top of shirt with RFID tag ID Y." Instead, the details stored in the item placement and clustering data storage 114 may include more general information such as "shirts within tag ID range X to Y are placed on shelf A," or "shirts within tag ID range X to Y are placed on shelf A at cell 1," etc., to enable a plausible field deployment by means of probabilistic computing. This data may be referred to herein as "item layout information," which may be used to generate contextual information as further discussed below.

Metric Augmentation Unit (MAU) Motion Confidence Level Calculation

With continued reference to FIG. 1, the RFID RSSI detection processing block 104 receives data from the RFID reader, which may include the measured RSSI values and corresponding RFID tag IDs. Alternatively, the RFID RSSI detection processing block 104 may compute the RSSI values using raw data received from the RFID reader. In any event, the RFID RSSI detection processing block 104 computes an RSSI value for each backscatter signal received from each respective RFID tag via the RFID reader, which may be calculated in accordance with any suitable technique depending upon the particular type of RFID tag and/or protocol that is implemented, including known techniques to do so. The calculated RSSI values for each detected RFID tag ID is then provided to the MAU processing block 106, as further discussed below.

Again, the RSSI values may vary over time based upon the physical location of an RFID tag with respect to the RFID reader, with the RSSI value increasing as the RFID tag is closer to the RFID reader and decreasing as the RFID tag moves further away. However, because of the nature of RFID backscattered signals, the measured RSSI value for the same RFID tag, even when stationary, will deviate over time, which may be caused by sample gaps, RF interference, multipath, shadowing effects, etc., as noted above. Unless accounted for, these variations in RSSI values may be interpreted as RFID tag motion, which constitutes a "false positive" read in such instance, i.e. interpreted as a human-item interaction when none has actually occurred.

Figure 3:
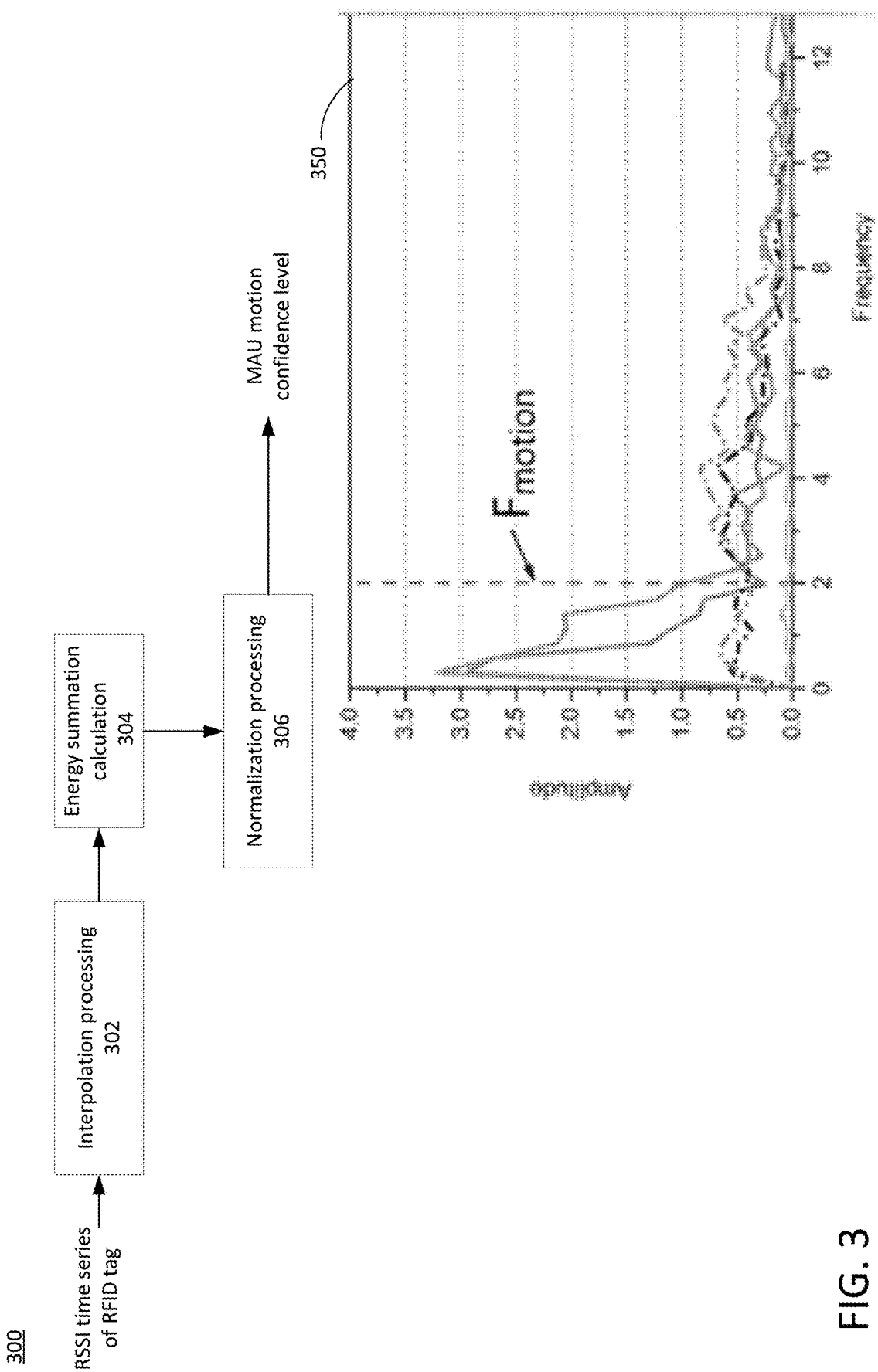
FIG. 3 illustrates an example process for the calculation of a metric augmentation unit (MAU) motion confidence level, in accordance with one or more aspects of the present disclosure.

Therefore, aspects include the MAU processing block 106 analyzing the RSSI values over time to determine candidates for RFID tags that have actually moved to enable these RFID tags to be discerned from stationary RFID tags that only appeared to have moved due to other types of RSSI fluctuations. In other words, the MAU processing block 106 functions to identify RFID tags having an increased likelihood of having been physically moved as opposed to those associated with RSSI fluctuations due to some other reason. In contrast to the aspects described herein, other existing motion tracking systems typically rely upon phase information instead of the RSSI information, but this requires a great deal of computational overhead. Moreover, the use of RSSI values instead of phase information eliminates the time sampling discontinuity of phase information, which is an inherent problem associated with the FCC mandate on frequency hopping in RFID systems. To implement RSSI values in lieu of phase information, aspects include the MAU processing block 106 performing a series of calculations, with an example of the process shown in FIG. 3. The process 300 as shown in FIG. 3 describes the calculation of the MAU motion confidence level metric. As shown in FIG. 3, the process 300 receives as input RSSI values sampled over a particular time period, and thus represents an RSSI time series for a particular RFID tag such as one of the RFID tags shown in FIG. 1, for instance.

In other words, the RSSI time series for each RFID tag may correspond, for instance, to a set of time-varying RSSI data values sampled over a particular set of successive time windows during which variations of the RSSI values were detected and thus for which RFID tag motion is suspected. Although this process is shown for a single RFID tag in FIG. 3, aspect include this process being repeated for any suitable number (e.g. all) of the RFID tags in a monitored environment. As an illustrative example, the RFID reader may continuously scan the monitored environment, or do so in accordance with a particular schedule (e.g. once every second, once per every 5 seconds, etc.). The RFID reader then obtains data based upon the RFID tag responses for a specific sampling time interval or "inventory round," and reports the RFID tags that were read each round, which may be processed by the RFID RSSI detection processing block 104. Thus, the RFID tags may be processed in batches as the RFID tags are updated in each round. The duration of the sampling time intervals or inventory rounds depend on the specific type of reader and reader mode that is implemented.

However, in any event, the aspects described herein may process the input RSSI values that were sampled over a particular time period (e.g. several inventory rounds) in successive windows, which may stream continuously over time or in accordance with any suitable type of data streaming schedule. As an example, the RFID tag candidates provided to the ACIP processing block 112 may be identified based upon a thresholding system associated with the MAU motion confidence level metric as discussed herein, which may be the result of processing batches of RFID reader scanned RFID tags within the monitored environment. As another example, the RFID tag candidates provided to the ACIP processing block 112 may be the result of the MAU processing block 106 processing RFID tag data associated with RFID tags that have already been narrowed down as likely candidates of moving RFID tags due to one or more other data pre-processing operations. For example, the RFID reader data may initially scan both phase and RSSI values associated with scanned tags to determine RFID tags that have a higher likelihood of having moved during a measured sampling window, and the data associated with these RFID tags are then provided to the MAU processing block as a result of operations performed via the RFID RSSI detection processing block 104. These pre-processing operations are outside the scope of this disclosure, as the aspects discussed herein are directed to further increasing the reliability of RFID tag motion being identified using RSSI data value processing regardless of how the RFID tag motion is initially determined.

To do so, the RSSI time series data as shown in FIG. 3 may represent data obtained over any suitable sampling period, which may be a duration of time corresponding to a retailer's open hours or a suitable portion thereof. However, the RSSI time series information received for each RFID tag in the monitored environment is typically not a fixed or constant rate, which is a dependent upon the number of RFID tags within range of the RFID reader as well as the particular environment. In other words, the RSSI values may be received over a period of time as RFID tags are energized or interrogated by the RFID reader's transmitted signal, as there is no guarantee that each RFID reader inquiry will result in an RFID tag response. Thus, the received RSSI time series values may be received over a fairly random temporal pattern during the larger overall sampling period.

To address this operational aspect of the system 100, aspects include interpolation processing block 302 performing an interpolation of the RSSI time series over a calculated fixed sampling window to regularize the RSSI time series values to a fixed sampling rate, denoted herein as $F_s$. In an aspect, the fixed sampling rate $F_s$ corresponds to a sampling window, which may vary based upon the particular application and the level of motion tracking that is desired. For instance, a smaller sampling window may be desired when a high level of motion tracking is desired. The fixed sampling rate may be calculated, for example, based upon an analysis of a collection of RSSI time series values in a particular monitored environment, selected as part of a test procedure, etc. Some examples of sampling windows may range from less than a second (e.g. 250 ms, with $F_s$=4 Hz) to 2 seconds ($F_s$=0.5 Hz) or more. In an aspect, the interpolation processing block 302 performs RSSI regularization by first buffering the RSSI samples (e.g. the RSSI time series values) into a fixed time window (e.g., a 2-second window). Next, the RSSI values are interpolated based on the values of the collected samples using, for instance, spline interpolation to up-sample or down-sample the number of samples to the selected sampling rate within the sampling window. Thus, the goal is to provide a fixed number of samples within the sampling window while retaining the shape of the RSSI time series values via linear interpolation.

Thus, the RSSI time series RFID tag information may correspond to a set of successive time windows that capture a variation in RSSI values, which may exceed a threshold value within a threshold time period, for example. Alternatively, the RSSI time series RFID tag information may be continuously sampled, although this may require more processing power and thus a thresholding system may be preferred. In any event, aspects include the energy summation calculation block 304 using the sampling rate $F_s$ to calculate, for the RSSI time series values within a set of successive sampling windows, the energy of the frequency components for the corresponding RSSI time series.

An example of the frequency components of a set of five different RSSI time series sets (e.g. each one being associated with a different RFID tag ID) is shown in the graph 350 in FIG. 3, which may represent a Fourier transform of an example set of RSSI time series measured over a duration of several sampling windows at the sampling rate of $F_s$. As shown in FIG. 3, the frequency axis in the graph 350 indicates variations in RSSI values for different RFID tags over a set of sampling windows, with the amplitude axis identifying the strength or amplitude of the corresponding frequency components over a range of frequencies up to about 13 Hz. The threshold frequency $F_{motion}$ as shown in the graph 350 represents a frequency threshold that distinguishes signal disturbances (which tend to be above this frequency threshold) from actual customer-item interactions (which tend to be below this frequency threshold). This is based on the observation that typical object browsing motion of customers is time constrained and not physically exaggerated. Therefore, the frequency of RSSI changes due to these interactions can be safely assumed to remain below a fixed value ($F_{motion}$,), of a few Hertz. The frequency threshold $F_{motion}$ as shown in the graph 350 corresponds to a frequency of about 2 Hz, but this is an example and this threshold frequency may be selected as any suitable value based upon test data, observations, a particular application or monitored environment, etc.

In an aspect, the energy summation calculation block 304 may calculate the energy of the frequency components of each RSSI signal time series that are less than the frequency threshold $F_{motion}$ to provide, for each RFID tag with a corresponding RSSI time series, an energy summation characterization. The normalization processing block 306 may then use a predetermined trained motion model to normalize the calculated energy of the frequency components of each RSSI signal time series. The predetermined trained motion model may include, for example, a model that represents different types of actual RFID tag motion in terms of the energy summation for an RSSI time series, which may consider the particular characteristics of the monitored environment and/or application, RFID tag types, etc. The normalization processing block 306 may then perform a normalization process by classifying each RFID tag's corresponding energy summation characterization to the predetermined trained model representing actual physical RFID tag motion. That is, the MAU processing block 106 may be configured to calculate the motion confidence level metric based upon a classification of the RFID tag energy summation characterization in accordance with the predetermined trained motion model that represents an energy of frequency components of moving RFID tags within the monitored environment. As a result, the normalization processing block 306 may output, for each set of RSSI values for each RFID tag over a particular set of sampling windows, a normalized metric that is a representation of confidence level of the classified motion using the trained model.

In various aspects, the predetermined trained motion models may be trained, for instance, using any suitable type of machine learning models, some examples including random forest, support-vector machine (SVM), logistic regression, etc. The features that feed these algorithms generally fall under two categories: phase and RSSI. For example, the RSSI feature set may include the trend extracted from the signal strength seasonal decomposition at specific frequencies, a residual extracted from the signal strength seasonal decomposition at specific frequencies, and/or a standard deviation of the signal strength measurements collected during a time window. The phase feature set may include, for instance, the slope of the linear regression of the frequency-phase curve, the correlation coefficient (or "R value") of the least-squares regression of the frequency-phase curve, descending trends calculated based on phase variation, the dynamic range of the signal phase values, and/or the number of zero crossings in the frequency-phase curve. In an aspect, the MAU processing block 106 may be configured to calculate the motion confidence level metric using the RSSI information and, optionally, RFID phase information from the predetermined trained motion model.

This MAU motion confidence level metric may be scaled in accordance with any suitable range of values, with the highest value indicating the greatest probability that a corresponding RFID tag was subjected to physical motion during a span of time corresponding to the sampling windows (i.e. the span of time corresponding to the series of time-varying RSSI data values). In this way, and as further discussed below, the rate of false positives may be reduced using the MAU, which functions to filter out the false positives using the frequency component and energy summation calculation. Turning back to FIG. 1, the MAU motion confidence level metric may form part of the MAU data that is provided to other components of the system 100. For instance, and as further discussed herein, the MAU data may include, in addition to the MAU motion confidence level metric, time stamps associated with identified RFID tag motion, RFID tag IDs, measured RSSI values, data provided by the RFID reader, etc.

The MAU motion confidence level metric may therefore be used to reduce or eliminate the occurrence of false positives with respect to identifying RFID tag motion and distinguishing such RFID tag motion from other sources of RSSI value variations. In various aspects, the MAU motion confidence level metric identifies those RFID tags that have a higher probability of being in motion within a monitored environment. Depending upon the speed and processing of the system 100, the MAU motion confidence level metric may be calculated via this process in real-time or as part of a post-processing operation, in various aspects.

Aggregated Contextual Inference Platform (ACIP)

Referring back to FIG. 1, the RFID tags for which the MAU motion confidence level metric is calculated may be further analyzed by the ACIP processing block 112 as part of a second level of processing. In general, the ACIP processing block 112 calculates and uses contextual information in conjunction with the MAU motion confidence level metric provided by the MAU processing block 106 to create combined analytics with improved accuracy levels by reducing the number of false positives in tag motion/interaction detection. The contextual information may be calculated using the item layout information, for example, which may be stored in the item placement and clustering data storage 114 as discussed herein.

To do so, the aspects described herein include the ACIP processing block 112 calculating contextual information using a baselining methodology for the RSSI measurements to initialize location dependent probability distributions in the monitored environment. As further discussed below, the ACIP processing block 112 also performs RSSI positional probability calculations. Thus, aspects include the MAU processing block 106 identifying the RFID tags in motion with an initial confidence level within the monitored environment that may include a large number of RFID tags, whereas the ACIP processing block 112 further improves the false positive rate of RFID tag motion by including additional RSSI-driven information specific to the monitored environment. The details of the ACIP processing block 112 are further discussed below.

In an aspect, the ACIP processing block 112 is configured to perform an RSSI baselining procedure, which captures a "clean" or baseline RSSI probability density function (pdf) reference with respect to the RSSI deviations over time for particular RFID tags and locations within the monitored environment. As part of the additional processing once the MAU motion confidence level metric is calculated, the ACIP processing block may reference the calibrated or RSSI baselined pdfs to further refine the analytical dataset to reduce false positives even further. This RSSI baselining procedure is discussed in further detail below, and may occur at any suitable time depending upon the application, but it is preferable to do so when there is no human and tag motion in the monitored environment. For instance, for a retail environment, the RSSI baselining may be done after hours or when the store is otherwise empty or closed. This can be programmed as part of the system 100 (e.g. as part of the operation of the ACIP processing block 112) to allow, for instance, several hours of data collection in the absence of customers moving in the vicinity of RFID tags to create a noise-free (or substantially noise free) data-driven pdf with a periodically (e.g. daily, weekly, etc.) updated distribution of products and shelves.

The RSSI baselining process allows updates to the pdf to adapt the operation of the system 100 to changes in the monitored environment, as well as changes in the placement of the items, which may be indicated by the item layout information stored in the item placement and clustering data storage 114. In other words, and as further discussed below, the RSSI baselining process provides grounding contextual information related to the positional/placement reference of stocked and RFID tagged items in a particular monitored environment. Again, the positional/placement information can be in the form of grouped, clustered, or bundled items co-located on a shelf, hanger, table, etc. Therefore, exact positional/placement information for each of the RFID tagged items is not needed.

Figure 4:
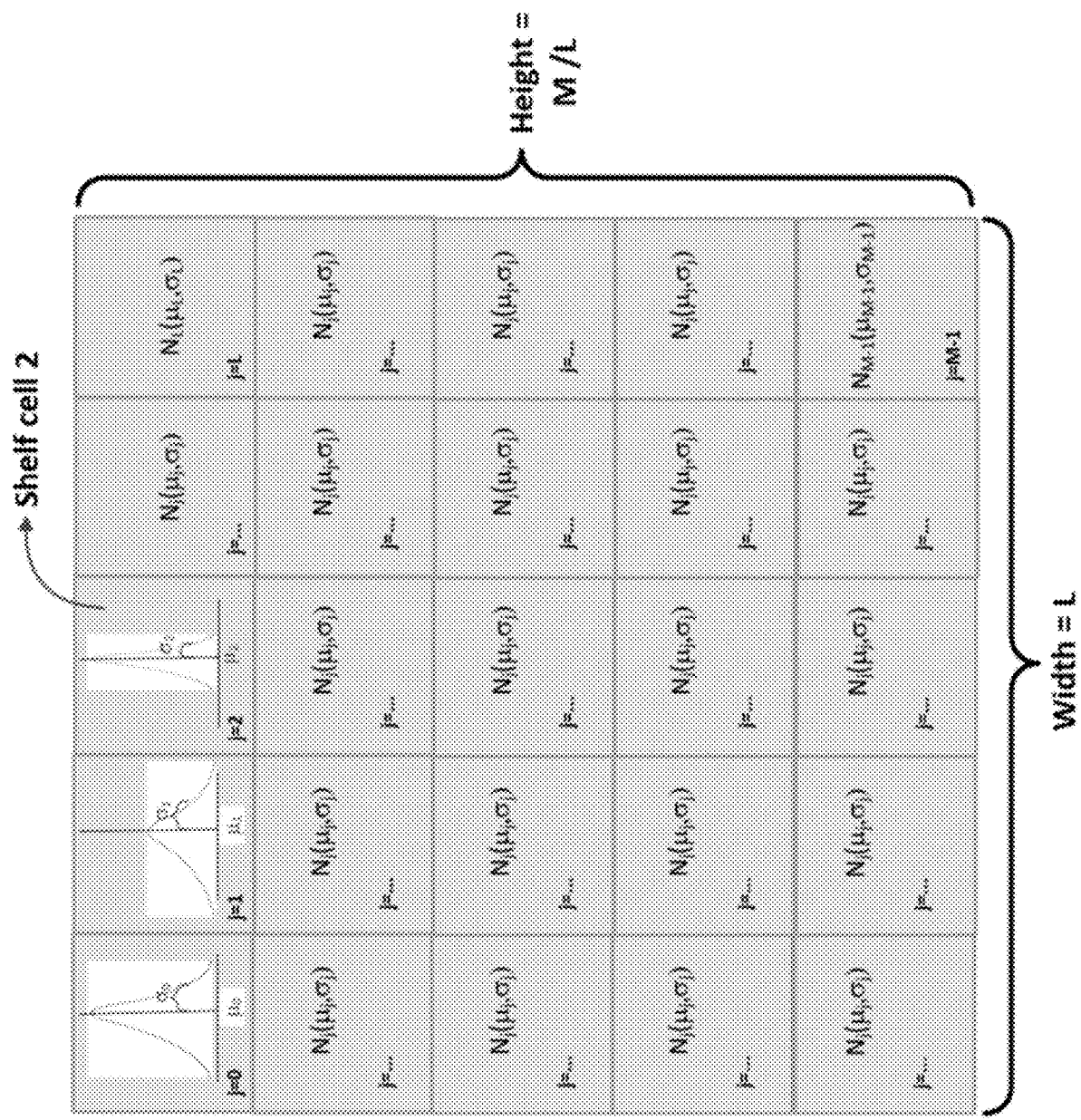
FIG. 4 illustrates an example of an ACIP RSSI baselining positional context perspective, in accordance with one of more aspects of the present disclosure.

FIG. 4 illustrates an example of an ACIP RSSI baselining positional context perspective, in accordance with one of more aspects of the present disclosure. As an example, the RSSI baselining result shown in FIG. 4 is with respect to the typical shelving configuration as shown in FIG. 2. As shown in FIG. 4, the ACIP processing block 112 calculates, as a result of the RSSI baselining process, a pdf for each defined shelf cell in the monitored environment. The pdf for each shelf cell may correspond, for instance, to all the RFID-tagged items placed in each cell, i.e., a particular location of items on a particular shelf as identified by the item layout information stored in the item placement and clustering data storage 114. To do so, aspects include the ACIP processing block analyzing multiple RSSI measurements over a large sampling period (e.g. during closing hours, which may be 10 hours or more for instance) from all the available RFID tags on all target shelf cells within the monitored environment. The specific size and shape of cells may be identified with smaller regions (e.g. sub-regions) within the monitored environment, which may be chosen depending upon the particular stocking layout, positions, size, and or other specific physical characteristics of a monitored environment. For instance, cells of similar clothing styles, sizes, commonly-grouped items in the same physical space, etc., may define individual cells.

As is generally known from previous studies of RFID RSSI measurements, the deviations of RSSI measurements over time follow a normal distribution. Therefore, the probability density functions constructed using this data-driven method are also normally distributed as shown in FIG. 4, with the pdf for each respective cell being characterized with a different average value $\mu$ and a standard deviation $\sigma$. Thus, the pdf corresponding to the RFID tags associated with a particular cell is expressed as $N(\mu,\sigma)$. In other words, the pdf represents the distribution of RSSI variations for all tags in a given cell, which may be considered a distribution "signature" for that cell. Thus, any RFID tag placed in that cell is expected to behave according to the pdf reference created for that cell. This distribution occurs as a result of natural variations in the wireless signal, small changes in the multipath, imperfections in the wireless circuitry, etc. RSSI baselining thus captures how the RSSI values received from all the static RFID tags placed in various locations probabilistically appear, i.e. how these signals deviate over time when in a static state. The normal pdf functions derived from the RSSI baselining procedure are provided herein by way of example and not limitation. The aspects described herein are not limited to this particular type of pdf, and may be adapted to model the RSSI value deviations for static tags during a baselining procedure in accordance with any suitable type of distribution or function depending upon the particular type of RFID tags (or other components) used, the specific type and structure of the monitored environment, etc. Additional details with respect to the example RSSI baselining process is further described below with reference to FIG. 5.

Figure 5:
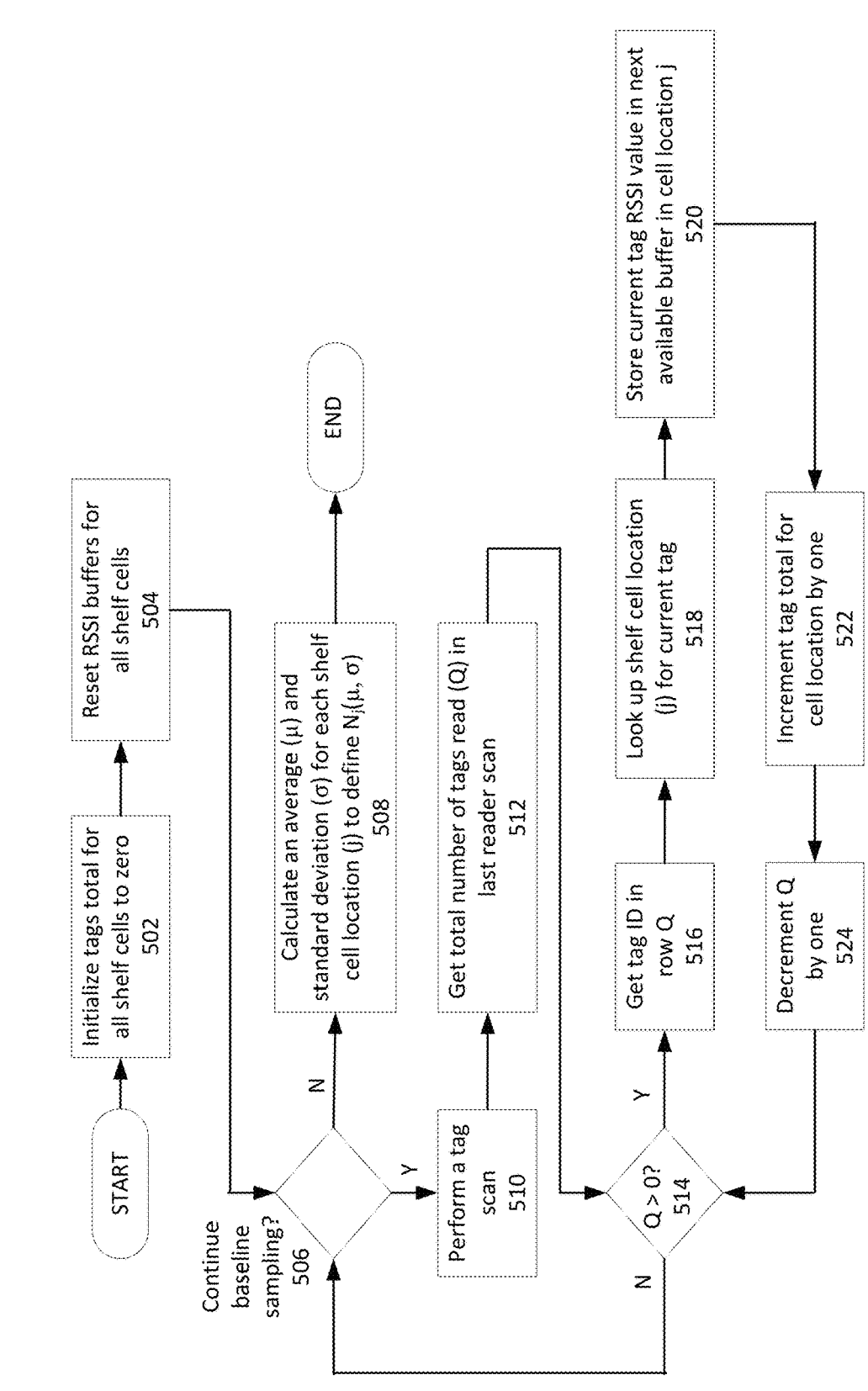
FIG. 5 illustrates an example of an ACIP RSSI baselining process, in accordance with one of more aspects of the present disclosure.

FIG. 5 illustrates an example of an ACIP RSSI baselining process, in accordance with one of more aspects of the present disclosure. The RSSI baselining process 500 as shown in FIG. 5 may be performed, for instance, via ACIP processing block 112 in conjunction with one or more other components of the system 100, as discussed herein. The process 500 may include an initialization of a number of tags for all shelf cells to zero (block 502). The RSSI value buffers for all shelf cells are then reset (block 504). Next, a decision is made whether to continue (block 506) baseline sampling of additional RFID tags. Assuming that this is the case (Y), then the process 500 includes performing a tag scan (block 510) (e.g. via the RFID reader) for a particular location within the monitored environment, or the entire environment, which may include the shelf setup described in FIG. 2 in this example.

For example, when an RFID reader performs a tag read, it may only be able to capture a subset of the available tags in the environment (indicated as 'Q'). The process 500 includes obtaining a total number Q of tags read in the previous reader scan (block 512). A check is then made to ensure that the number of read tags Q remaining is greater than zero (block 514). If so (Y), then process 500 includes obtaining the unique RFID tag ID (block 516), and looking up the shelf cell location j associated with the current identified RFID tag (block 518). The process of identifying a location j for an identified RFID tag may include, for instance, using the item layout information stored in the item placement and clustering data storage 114. This current RSSI value for the current RFID tag is then stored (block 520) in the next available buffer (e.g. in a memory utilized or otherwise accessed via the ACIP processing block 112) for the current cell location j.

Next, the process 500 includes incrementing (block 522) the tag total for the cell location j by one, and decrementing the total number of tags read (Q) by one (block 524). The check is then performed again with respect to the total number of read tags being greater than zero, with this process continuing by associating each RFID tag's RSSI value for a particular cell j until all Q number of RFID tags have been accounted for, in which case the result of the inquiry at block 514 is 'N.' A decision then made regarding whether to repeat this process and continue the baseline sampling (block 506) for another RFID tag scan. This may include, for example, an expiration of a timer, reaching a predetermined number of read iterations, or other suitable condition upon which the baselining process is deemed to have been completed. Once completed (block 506, N), the process 500 includes calculating an average value $\mu$ and a standard deviation $\sigma$ for each defined shelf cell location j to define the set of pdfs $N(\mu,\sigma)$ for all RFID tags within each cell location (block 508), as shown and described above with reference to FIG. 4.

Thus, the process 500 functions to perform a number of RFID tag RSSI measurements for each cell, with the value of each RSSI measurement being stored in memory for each cell until the end of the baselining process. Once completed, the average ($\mu$) and standard deviation ($\sigma$) for the distribution of RSSI measurement variations across all RFID tags within each cell are computed. All $\mu$ and $\sigma$ values are stored by the ACIP processing block 112 for use in RSSI probability calculations later, as further discussed below. For each read operation, Q may be different. After a read scan, a number Q of RSSI measurements are then processed and used to update shelf cell data. Again, this process is repeated over a sufficiently long period of time (e.g. 10 hours) to create representative RSSI pdfs for each cell. During these calculations, the ACIP processing block 112 may associate RFID tag IDs with the cell it is located using the store's inventory database or other suitable location (e.g. the item layout information stored in the item placement and clustering data storage 114) with respect to how the tagged items are grouped and positioned with respect to the physical cells.

Once the RSSI baselining process 500 is completed, aspects include the ACIP processing block 112 performing RSSI probability computations, which may be performed, for example, as part of the standard operation of the system 100 during the open hours or when tag motion is otherwise being evaluated within the monitored environment. An example of the RSSI probability computation process is shown in further detail in FIG. 6. Like the RSSI baselining process 500 as shown in FIG. 5, the RSSI probability computation process 600 as shown in FIG. 6 may also be performed, for instance, via the ACIP processing block 112 in conjunction with one or more other components of the system 100, as discussed herein.

Figure 6:
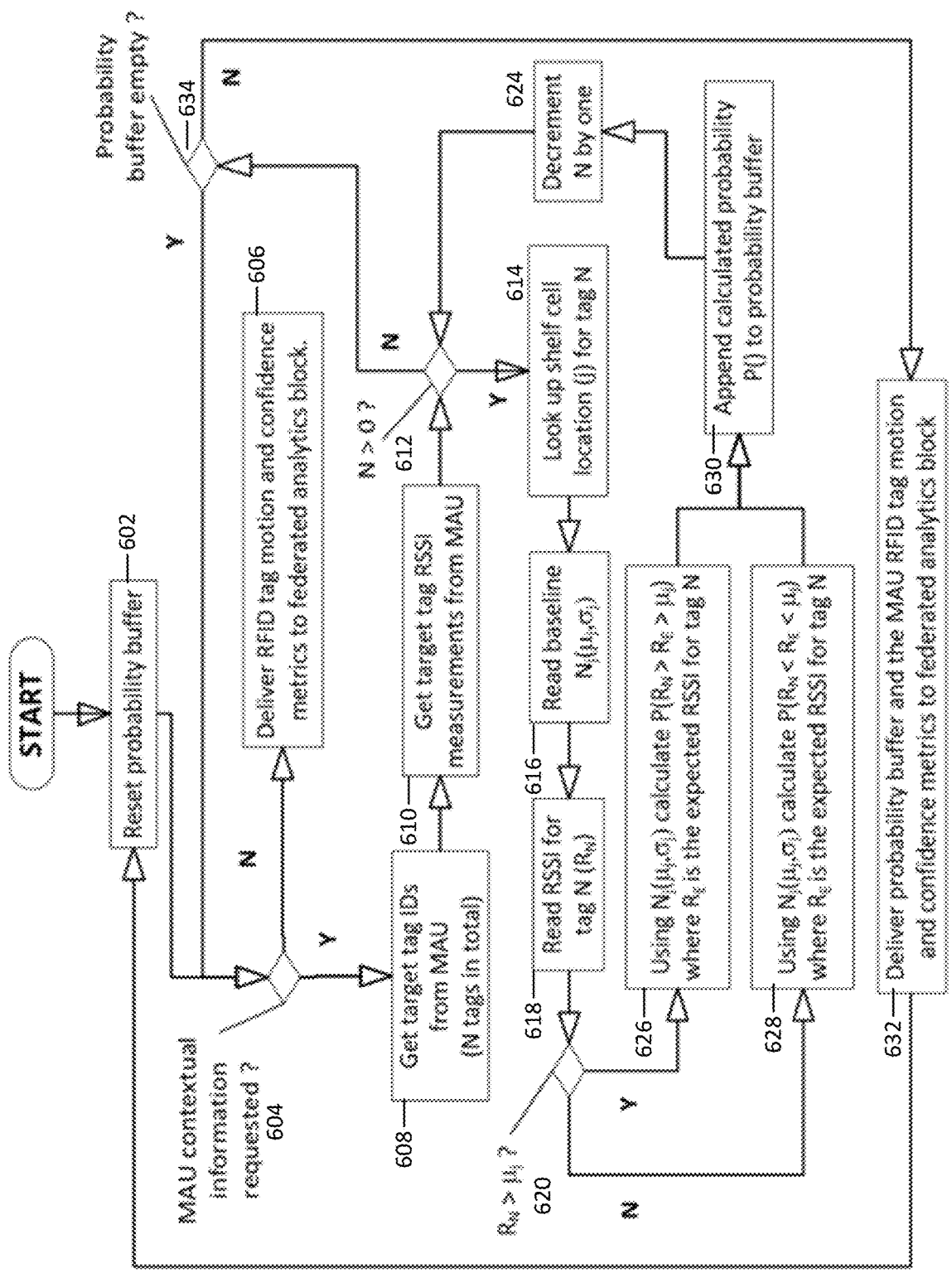
FIG. 6 illustrates an example RSSI probability computation process, in accordance with one of more aspects of the present disclosure.

In various aspects, the RSSI probability computation process 600 as shown in FIG. 6 may begin by resetting (block 602) the probability buffer, which may include clearing the portion of memory used by the ACIP processing block 112 to calculate the RSSI probabilities. As further discussed below, the overall goal of the probability computation process 600 is to provide specific types of data within the analytical dataset that is provided to the data analytics platform. The amount and type of data included as part of the analytical dataset may depend, for example, upon whether the probability computation process applies a second level of processing to RFID tags that were identified as moving candidates based upon their MAU motion confidence level metrics.

Thus, aspects include the RSSI probability computation process 600 as shown in FIG. 6 using a conditional-based trigger, which functions to control whether the initial candidates for RFID tags for which motion was detected via the MAU processing block 106, which is represented in FIG. 6 as block 604. That is, block 604 as shown in FIG. 6 results in the determination of RFID tags that were identified as moving candidates as discussed above are subjected to a second level of processing. As an example, the MAU motion confidence level metrics may be used to facilitate this determination, although this is my way of example and not limitation. In accordance with the aspects described herein, the determination at block 604 may be performed in accordance with any suitable number and/or type of conditions and/or metrics. For example, and as further discussed below, a threshold MAU motion confidence level metric value, a threshold number of candidate RFID tags, or other suitable conditions may be used at block 604 to determine whether the RSSI probability computation process 600 should be executed for those RFID tag candidates. For instance, the threshold MAU motion confidence level metric value and/or number of candidate RFID tags used in block 604 may predetermined or be dynamic in nature, i.e. adjusted based upon other conditions, such as the current time of day, expected traffic within the monitored environment, the current time of year, etc.

As an example, aspects include block 604 triggering the RSSI probability computation process 600 to address false positives under two conditions. The first of these is when a set of RFID candidate tags (e.g. a threshold number or a threshold number within a cell) each have respective MAU motion confidence level metric values that indicate a low level of confidence, e.g. each set of the RFID tag candidates has an MAU motion confidence level metric value less than a defined threshold. A second example includes the MAU motion confidence level metric values identifying a number of RFID tags in motion (regardless of motion confidence level metric values) that exceed a threshold RFID tag number. Again, these trigger conditions may be predetermined, or may be dynamically changed, and are by way of example and not limitation. When the determination is made to trigger the RSSI probability computation process 600 for a specific subset of RFID tags (e.g. RFID tag candidates) (block 604, Y), aspects include the ACIP processing block 112 determining the RFID tag IDs and associated RSSI measurements for the subset of RFID tags based upon their respective MAU motion confidence level metric values (blocks 608, 610).

Next, as long as the number of the subset of RFID tags is greater than zero (block 612), the ACIP processing block 112 determines, for each of the tags identified in the RFID tag subset, a corresponding cell associated with the physical placement of the RFID tag in the monitored environment (block 614). Again, this may be determined using the item layout information stored in the item placement and clustering data storage 114 or other suitable available data, as discussed herein. Once the cell is identified, the ACIP processing block 112 has the appropriate data to select (block 616) which baseline pdf to use to calculate (block 618) the RSSI probability using the measured RSSI ($R_N$) of that RFID tag (which may be provided by the MAU processing block 106).

Figure 7:
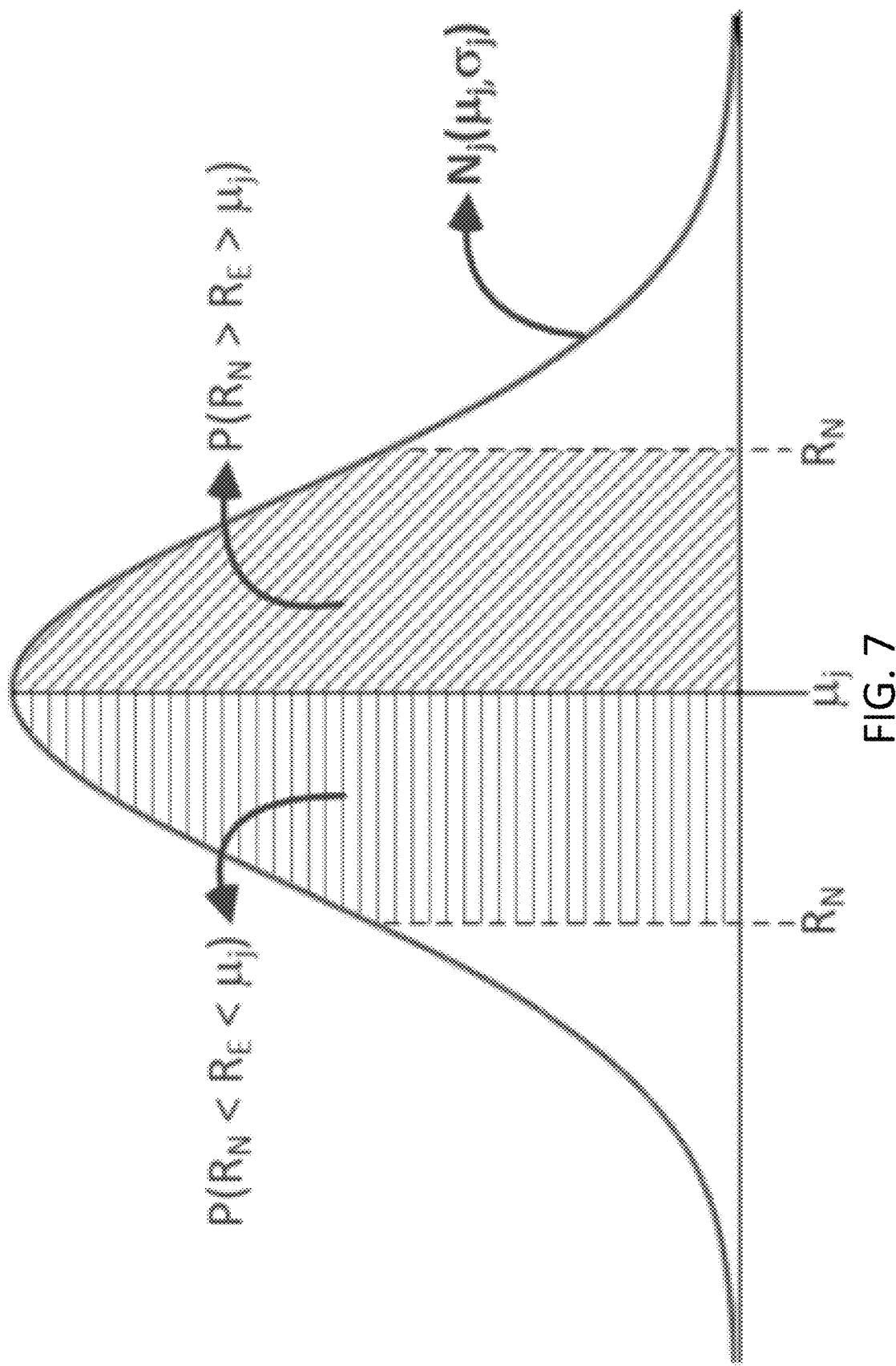
FIG. 7 illustrates an example of additional details associated with an RSSI probability computation process, in accordance with one of more aspects of the present disclosure.

Next, the ACIP processing block 112 determines (block 620) whether, depending on if $R_N$ is greater or less than the baseline RSSI average value ($\mu_j$) for the particular cell 'j' to which the RFID tag is associated, how the probability of an RSSI measurement ($R_E$) is expected to vary as indicated by the shaded regions of the pdf. An example of this comparison is shown in greater detail in FIG. 7, which illustrates an example of an RSSI probability calculation for a particular cell in accordance with a normal distribution pattern. With reference to FIG. 7, when an RFID tag is static, $R_N$ is expected to be close to $\mu_j$, since the baseline $\mu_j$ was calculated during the RSSI baselining process based upon the tag being static. However, if the motion intensity of the RFID tag increases, $R_N$ significantly diverges from $\mu_j$. Therefore, the larger the shaded areas (i.e. higher the probabilities), the more likely the RFID tag is actually in motion. The RSSI value $R_N$ may also diverge significantly from $\mu_j$ due to environmental factors such as RF noise and nearby customer movements, and these unwanted sources need to be identified and filtered. In an aspect, this may be achieved by determining (not shown) whether all the RFID tags forwarded by the MAU processing block 106 have a similar level of RSSI deviation from their respective baseline averages. If this is the case, then the culprit is noise in the environment, and therefore tag motion can be flagged as false positive and ignored.

In an aspect, the ACIP processing block 112 calculates the probability $P(R_N > R_N > \mu_j)$ at block 626 when $R_N > \mu_j$, and calculates the probability $P(R_N < R_N < \mu_j)$ at block 628 when $R_N < \mu_j$. The calculated probabilities are appended in either case (block 630) to the probability buffer data, the number N of the subset of RFID tags decremented by one (block 624), and the process repeated until all RFID tags in the subset have been accounted for (block 612, 'N'). The calculated probability values are then provided as part of the analytical dataset (block 632), once it is determined that the probability buffer is not empty (block 634). In an aspect, the RSSI probabilities may be calculated for a given $R_N$ and $N(\mu_j, \sigma_j)$ using a cumulative distribution function (CDF) of the standard normal distribution (denoted by ø) as shown in Equation 1 below:

$$\emptyset(x) = P(Z \le x) = \frac{1}{\sqrt{2\pi}} \int_{-\infty}^{x} \exp\left\{-\frac{u^2}{2}\right\} du \qquad \text{Eqn. 1}$$

In other words, Equation 1 represents the probability of a normally-distributed variable Z to take on values less than a threshold x. The portion $$\exp\left\{-\frac{u^2}{2}\right\}$$

of Equation 1 represents the bell curve shape as shown in FIG. 7. Because this integral does not have a closed form solution, aspects include the ACIP processing block 112 using lookup tables or other suitable calculation techniques, including known techniques, to compute ø for a given x. Aspects include normalizing the measured $R_N$ to the standard normal distribution by subtracting $\mu_j$ and dividing the difference by $\sigma_j$. This normalized version is referred to as $R_{N,n}$. If $R_N > \mu_j$ is true (i.e. the shaded area in the right in FIG. 7), then the probability of a measured RSSI ($R_E$) to fall within the right shaded region may be calculated in Equation 2 below as follows:

$$P(R_N > R_E > \mu_j) = P(R_{N,n} > R_E > 0) = \emptyset(R_{N,n}) - 0.5 \qquad \text{Eqn. 2:}$$

Similarly, if $R_N < \mu_j$ is true (i.e. the left shaded area in FIG. 7), then the probability of a measured RSSI ($R_E$) to fall within the left shaded region may be calculated in Equation 3 below as follows:

$$P(R_N < R_E < \mu_j) = P(R_{N,n} < R_E < 0) = 0.5 - \emptyset(R_{N,n}) \qquad \text{Eqn. 3:}$$

Once the ACIP processing block 112 calculates all the RSSI probabilities for the RFID tags listed by the MAU processing block 106, these probabilities can be forwarded to the analytics block (with the MAU identified RFID tag motion and MAU values). Again, the higher the RSSI probabilities, the more likely these RFID tags are to be in motion. Therefore, if MAU confidence level (MAU metric) is high for an RFID tag while the RSSI probability is low, this is likely to be a false positive, and the tag can be regarded as static.

Referring back to FIG. 1, in an aspect identified RFID tag motion may be provided as part of an analytical dataset to the data analytics processing block 116, which may include the MAU data as discussed above, and which may include the MAU motion confidence level metrics calculated for each instance of detected RFID tag motion, the time of occurrence of the motion, a duration of the motion, a particular location within the monitored environment, etc. The analytical dataset may have any suitable format and/or data type, which may be used in accordance with various platforms to extract desired information regarding the monitored environment that can be inferred from an accurate identification of RFID tag motion over a particular sampling period. Again, this may include, for instance, shopper browsing habits, foot traffic patterns, the location of items throughout a working shift, whether items are regularly replaced in the correct location, etc.

As an example, the analytical dataset may be provided to a framework such as federated analytics, but the aspects described herein are not limited to these types of examples. As further discussed herein, the aspects described herein function to increase the probability that detected RFID tag motion corresponds to actual physical motion in the monitored environment, irrespective of the manner in which the analytical dataset is used or the particular framework used to derive data from the analytical dataset. Moreover, the aspects described herein may be particularly useful in a real retail environment, as sometimes customers misplace items on the shelves, and such misplacements can potentially be detected using the RSSI baselining process described herein. For example, if repetitive baseline RSSI measurements for a static tag in a cell are consistently different from other tags in that same cell, the outlier tag is likely to be a misplaced item. To roughly locate which shelf cell the misplaced item is, correlating the baseline RSSI measurements of the outlier RFID tag with that of RFID tags in all other cells can be a feasible approach. This may also help staff to locate the misplaced item and to replace it to its original location with less effort.

The sample model described with reference to FIG. 7 for calculating the RSSI probability is provided by way of example and not limitation. Aspects include modifying the model in various ways, such as by incorporating multipath profiles of the monitored environment, as well as other path loss terms. Such extensions can potentially improve the accuracy of the RSSI probability calculations, thereby improving the false positive estimations.

An optional modification to the aspects described herein includes the use of additional sensor modalities to further improve upon the efficiency and/or accuracy of the RSSI probability computation process 600, which are shown in FIG. 1 as auxiliary sensing 108 (e.g. cameras, motion sensors, etc.) and the auxiliary sensor(s) processing block 110 (e.g. one or more processors that analyze the data generated by the auxiliary sensing modalities. For instance, surveillance cameras that can detect human presence and human counting may also be present in a monitored environment, as well as motion sensors that may be used as part of an alarm system or for other purposes. Thus, an optional modality that may be useful for generating contextual information is the use of optical sensing by means of security cameras often available in retail environments.

Figure 8:
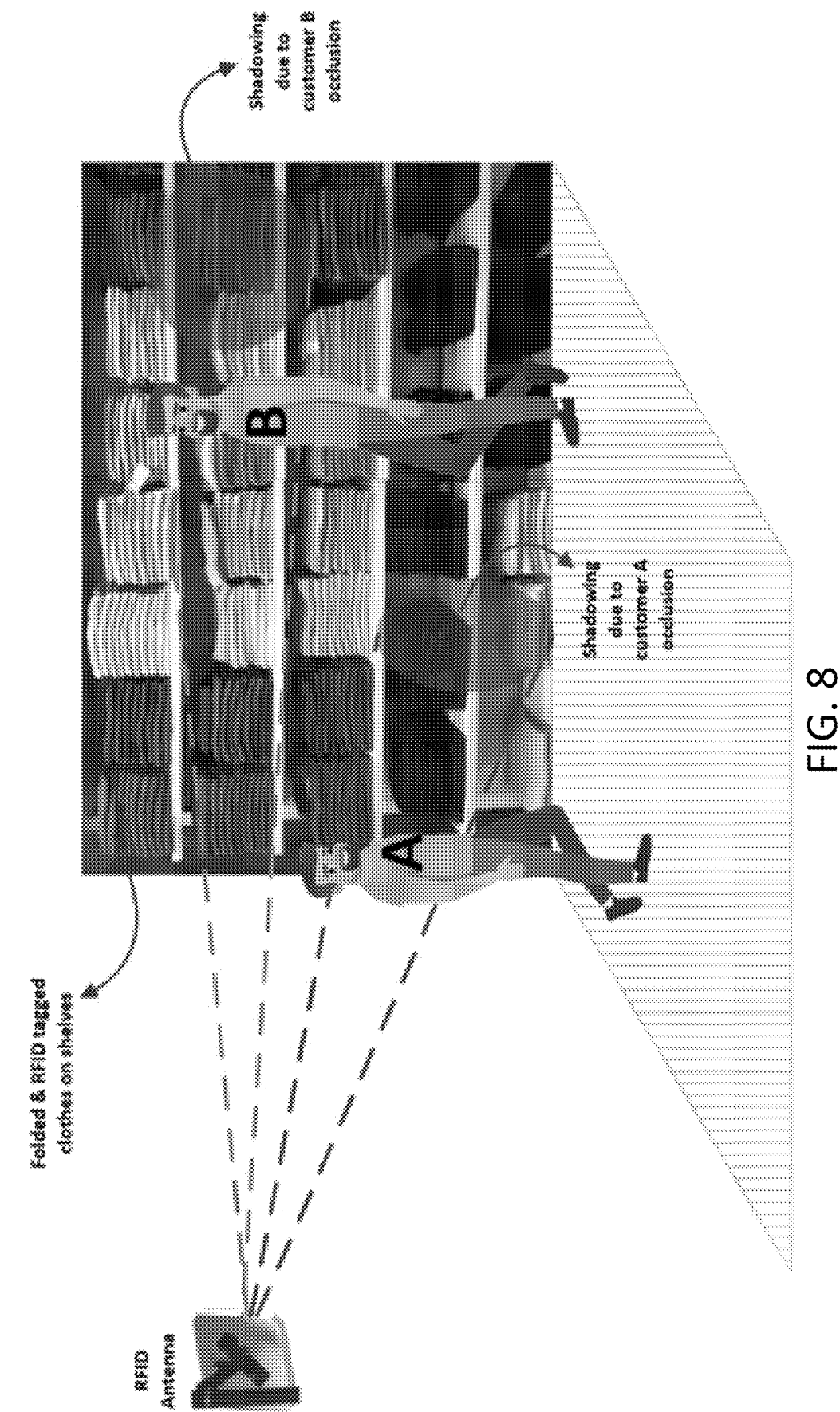
FIG. 8 illustrates an example RFID line of sight (LOS) occlusion scenario, in accordance with one or more aspects of the present disclosure.

The use of these auxiliary sensing modalities may be useful, for instance, because a typical problem with RFID sensing in a retail environment occurs when the customer is located between the RFID reader and a group of tagged items stored on shelves while browsing. An example of this scenario is shown in FIG. 8. When the direct line of sight is blocked, this significantly increases the fluctuations on the measured RSSI for each RFID tag. In such cases, RFID tags that are shadowed by the customers may appear to be in motion due to customer movements even in the absence of any tagged item interactions, causing an increase in the false positives. Because an RFID system does not have a way of detecting increased people traffic on the shop floor, optical sensing capability of existing cameras can be used to make this inference.

Figure 9:
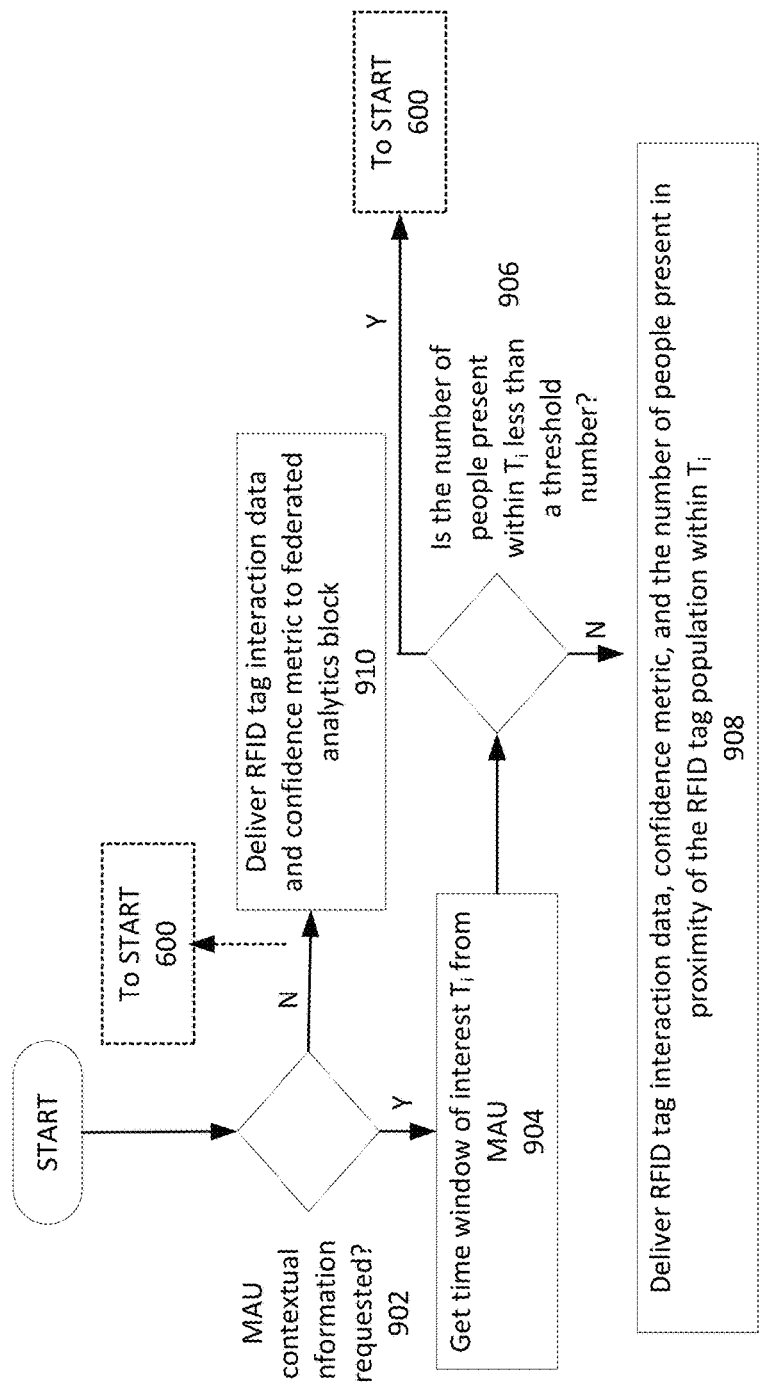
FIG. 9 illustrates an example of an auxiliary sensor modality computation process, in accordance with one or more aspects of the present disclosure.

Camera or motion detection information identifying RFID tagged item occlusion scenarios may be incorporated in several ways depending on the implementation, in various aspects. For example, a camera may function to identify and count the number of customers present around a particular location within a monitored environment at a given time period. If the number, size, shape, or location of detected persons or objects in a particular region within the monitored environment matches one or more conditions, then any candidate RFID tags that may be identified as moving in that particular region of occlusion may be "gated," or not provided as part of an analytical dataset to the data analytics processing block 116, as the reliability of the detected motion for these tags is not considered a reliable measurement during such time periods. As example of an auxiliary sensor modality to assist with RFID interaction sensing is shown in FIG. 9. The process as shown in FIG. 9 may alternatively be performed by the ACIP processing block 112 as shown in FIG. 1, or any other suitable component and/or processor implemented by the system 100.

As shown in FIG. 9, the process 900 may begin in a manner that is similar to the process 600 as shown in FIG. 6. For example, at block 902 a determination is made whether candidate RFID tags identified via the MAU processing block 106 as discussed above are subjected to additional processing, which may be based upon one or more predetermined conditions. If not, then the RFID tag interaction data and confidence metric may be provided (block 910) to the data analytics block 116 as part of the analytical dataset. Optionally, if the candidate RFID tags identified via the MAU processing block 106 do not need to be subjected to additional processing via the process 900, aspects include performing the process 600 on the candidate RFID tags. This may include, for example, using a different set of conditions for the process 900 at block 902 compared to the conditions used in the process 600 at block 602. In this way, aspects include modifying the conditions used to qualify the RFID candidate tags for the processes 600, 900 to tailor the overall RSSI probability calculation and metrics sent to the data analytics block 116 based upon a particular implementation.

However, if the candidate RFID tags identified via the MAU processing block 106 are to be subjected to additional processing, the process 900 includes determining (block 904) a time window of interest $T_i$ from the MAU data received form the MAU processing block 106. The time window of interest may correspond, for instance, to the same time period for which the time-varying RSSI data values were received (e.g. as shown and discussed with reference to FIG. 3). The process 900 may include determining (block 906) whether a number of people present within the time window $T_i$ is less than a threshold number. If not, then the RFID tag interaction data, confidence metric, and number of people present in proximity of the RFID tag candidates may be provided (block 908) to the data analytics block 116 as the analytical dataset. Optionally, if the number of people present within the time window $T_i$ is less than the threshold number, aspects include performing the process 600 on the candidate RFID tags. In this way, the process 900 may function as an initial gateway to the further processing of identified candidate RFID tags via the process 600. However, if the threshold number of people is exceeded, then the RFID tag motion inference indicates too many tags are in motion with a high confidence, and thus that inference can be discarded without forwarding the data to the data analytics block 116 to avoid excessive errors.

Furthermore, if a camera installation setup allows for the identification of specific areas of the display shelves, aspects additionally or alternatively include an inference on a subset of RFID tags placed on those shelves (rather than the entire detected tag population in the space) being used to flag false positives. This approach will provide a higher accuracy at the cost of increased camera coverage and/or capability (e.g. by using depth cameras rather than 2D cameras). Also, if camera installations are aligned with the RFID reader field of view, this would provide the best performance in terms of false positive identification.

Figure 10:
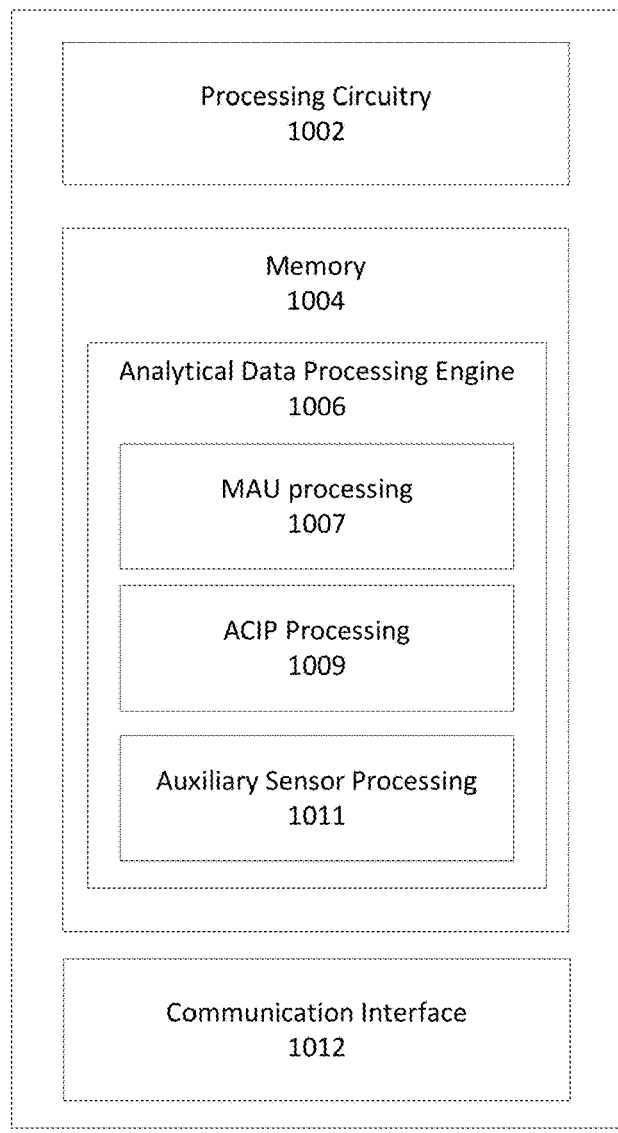
FIG. 10 illustrates an example of a computing device, in accordance with one or more aspects of the present disclosure.

FIG. 10 illustrates an exemplary computing device, in accordance with various aspects of the present disclosure. The computing device 1000 (also referred to herein as processing circuitry or a processing system) may be identified with one or more components of the system 100 as discussed herein with respect to FIG. 1, which perform the various processing operations to detect RFID tag interactions (e.g. motion as a result of human interaction) and accompanying metrics, which are provided to the data analytics block 116, as discussed herein. Again, the aspects described herein are not limited to the examples described herein, and the functions performed by the computing device 100 may additionally or alternatively be performed by other components of a system (e.g., the system 100), such as an RFID reader, remote computing devices not shown in the Figures, etc.

In an aspect, the computing device 1000 may be implemented in different ways depending upon the particular application, type, and use with respect to the system in which it is installed or otherwise forms a part. For instance, computing device 1000 may be identified with one or more portions of a computing platform such as a server computer, a cloud computing platform, a mobile device, etc. Regardless of the particular implementation, to perform the various functionality as described herein, the computing device 1000 may include processing circuitry 1002, a memory 1004, and a communication interface 1012. The components shown in FIG. 10 are provided for ease of explanation, and aspects include the computing device 1000 implementing additional, less, or alternative components as those shown in FIG. 10.

In various aspects, the processing circuitry 1002 may be configured as any suitable number and/or type of computer processors, which may function to control the computing device 1000 or other components of the system in which it is implemented. Processing circuitry 1002 may be identified with one or more processors (or suitable portions thereof) implemented by the computing device 1000. For example, the processing circuitry 1002 may, for example, be identified with one or more processors such as a host processor, a digital signal processor, one or more microprocessors, graphics processors, microcontrollers, an application-specific integrated circuit (ASIC), part (or the entirety of) a field-programmable gate array (FPGA), etc.

In any event, aspects include the processing circuitry 1002 being configured to carry out instructions to perform arithmetical, logical, and/or input/output (I/O) operations, and/or to control the operation of one or more components of computing device 1000 to perform various functions associated with the aspects as described herein from the perspective of one or more components of a system such as system 100 for instance. For example, the processing circuitry 1002 may include one or more microprocessor cores, memory registers, buffers, clocks, etc., and may generate electronic control signals associated with electronic components to control and/or modify the operation of one or more components of the computing device 1000 and/or components of the system in which it is implemented as discussed herein. Moreover, aspects include processing circuitry 1002 communicating with and/or controlling functions associated with the memory 1004 and/or the communication interface 1012.

In an aspect, the memory 1004 stores data and/or instructions such that, when the instructions are executed by the processing circuitry 1002, the computing device 1000 performs various functions as described herein. The memory 1004 can be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1004 can be non-removable, removable, or a combination of both. For example, the memory 1004 may be implemented as a non-transitory computer readable medium storing one or more executable instructions such as, for example, logic, algorithms, code, etc.

As further discussed below, the instructions, logic, code, etc., stored in the memory 1004 are represented by the various modules as shown in FIG. 10, which may enable the aspects disclosed herein to be functionally realized. Alternatively, if the aspects described herein are implemented via hardware, the modules shown in FIG. 10 associated with the memory 1004 may include instructions and/or code to facilitate control and/or monitor the operation of such hardware components. In other words, the modules shown in FIG. 10 are provided for ease of explanation regarding the functional association between hardware and software components. Thus, aspects include the processing circuitry 1002 executing the instructions stored in these respective modules in conjunction with one or more hardware components to perform the various functions associated with the aspects as further discussed herein.

The analytical data processing engine 1006 may represent the functionality discussed herein with respect to the system 100 as shown in FIG. 1, for example, which may include receiving RFID tag reader information for a monitored environment, the determination of candidate RFID tags that have likely moved, probabilistic calculations regarding this motion being due to human interaction, and storage of this information, as well as other various metrics, to a data analytics platform. To do so, aspects include the analytical data processing engine 1006 including an MAU processing module 1007, an ACIP processing module 1009, and an auxiliary sensing module 1011.

In an aspect, the executable instructions stored in the MAU processing module 1007 may facilitate, in conjunction with execution via the processing circuitry 1002, the calculation of the MAU motion confidence level metric based upon data received from a set of scanned RFID tags over several time windows during a larger overall sampling period. For example, the MAU processing module 1007 may calculate MAU motion confidence level metrics as discussed herein with respect to the functionality performed via the RFID reader, the RFID RSSI detection processing block 104, and the MAU processing block 106 as shown in FIG. 1 and the process 300 as described with reference to FIG. 3.

In an aspect, the executable instructions stored in the ACIP processing module 1009 may facilitate, in conjunction with execution via the processing circuitry 1002, the calculation of analytical datasets to be provided to an analytical data platform such as the data analytics block 116, as discussed herein. The ACIP processing module may enable the RSSI baselining process 500, as discussed herein with reference to FIG. 5, as well as the RSSI probability calculations in process 600 as discussed herein with reference to FIG. 6. For example, the ACIP processing module 1009 may calculate analytical datasets as discussed herein with respect to the functionality performed via the ACIP processing block 112, as shown in FIG. 1.

In an aspect, the executable instructions stored in the auxiliary sensor processing module 1011 may facilitate, in conjunction with execution via the processing circuitry 1002, the calculation of various metrics related to the presence of occlusion zones (e.g. the number of people in a particular region during an RFID tag scanning operation). These metrics may function to eliminate RFID tag candidates that may otherwise be included as part of the analytical dataset provided to the analytical data platform, such as the data analytics block 116, for instance, as discussed herein. The auxiliary sensor processing module 1011 may enable the process 900, as discussed herein with reference to FIG. 9, for instance. For example, the auxiliary sensor processing module 1011 may calculate various metrics as discussed herein with respect to the functionality performed via the auxiliary sensor(s) processing block 110 and/or the ACIP processing block 112, as shown in FIG. 1.

To transmit and receive data from other components of the particular system (e.g. system 100) in which it is implemented, aspects include the computing device 1000 implementing a communication interface 1012. The communication interface 1012 may enable communications in accordance with any suitable communication protocol(s). The communication interface 1012 may function to support the functionality described herein with respect to the various processing blocks as shown in FIG. 1, for example, exchanging information with other components as shown and described herein. This may include, for example, the ACIP processing block 112 receiving the MAU confidence level metrics from the MAU processing block 106, the ACIP processing block 112 receiving item layout information from the item placement and clustering storage 114, the ACIP processing block transmitting the analytical datasets to the data analytics block 116, etc.

EXAMPLES

The following examples pertain to further aspects

Example 1 is a computing device, comprising: a communication interface configured to receive a series of time-varying receive signal strength indicator (RSSI) data values associated with each respective radio-frequency identification (RFID) tag from among a set of RFID tags located within a monitored environment; and processing circuitry configured to, for the series of time-varying RSSI data values associated with each respective RFID tag from among the set of RFID tags: calculate an energy of frequency components of the time-varying RSSI data values; calculate an RFID tag energy summation characterization based upon a summation of the energy of the frequency components of the time-varying RSSI data values that are less than a threshold frequency; and calculate a motion confidence level metric indicative of a probability that the respective RFID tag was subjected to physical movement during a span of time corresponding to the time-varying RSSI data values based upon the RFID tag energy summation characterization.

In Example 2, the subject matter of Example 1, wherein the processing circuitry is further configured to calculate the motion confidence level metric based upon a classification of the RFID tag energy summation characterization in accordance with a predetermined trained motion model of energy of frequency components of moving RFID tags within the monitored environment.

In Example 3, the subject matter of any combination of Examples 1-2, wherein the processing circuitry is configured to selectively process, based upon the motion confidence level metric, each series of time-varying RSSI data values associated with a respective RFID tag from among the set of RFID tags to calculate a probability with respect to an expected variation of the respective time-varying RSSI data values associated with each respective RFID tag, wherein an increased probability is indicative of a higher likelihood of an RFID tag being subjected to physical movement.

In Example 4, the subject matter of any combination of Examples 1-3, wherein the processing circuitry is configured to process each series of time-varying RSSI data values associated with a respective RFID tag from among the set of RFID tags when a number of the set of RFID tags exceeding a threshold RFID tag number have a motion confidence level metric value that is less than a confidence level metric threshold number.

In Example 5, the subject matter of any combination of Examples 1-4, wherein the processing circuitry is configured to process each series of time-varying RSSI data values associated with a respective RFID tag from among the set of RFID tags when the a number of the set of RFID tags located within the monitored environment exceeds a threshold RFID tag number.

In Example 6, the subject matter of any combination of Examples 1-5, wherein the set of RFID tags are from among a plurality of RFID tags within the monitored environment, and wherein the processing circuitry is configured to: perform an RSSI baselining procedure during a period of time in which the plurality of RFID tags within the monitored environment are static; and calculate, for each one of a set of regions within the monitored environment, a probability density function (pdf) with respect to RSSI data value variations of RFID tags located within each respective one of the regions over the period of time.

In Example 7, the subject matter of any combination of Examples 1-6, wherein the set of RFID tags are associated with the same region within the monitored environment, and wherein the processing circuitry is further configured to calculate the probability of the expected variation of the time-varying RSSI data values associated with the set of RFID tags using the pdf associated with the region occupied by the set of RFID tags within the monitored environment.

In Example 8, the subject matter of any combination of Examples 1-7, wherein the processing circuitry is configured to selectively process each series of time-varying RSSI data values associated with a respective RFID tag from among the set of RFID tags further based upon an identification of an occlusion zone corresponding to a physical location of the set of RFID tags within the monitored environment, wherein the occlusion zone is identified based upon sensor data indicating that a number of objects exceeding a threshold number in the proximity of the RFID tags during a time period corresponding to the time-varying RSSI data values.

Example 9 is a computing device, comprising: a memory storing instructions thereon; and one or more processors configured to execute the instructions stored in the memory to, for a series of time-varying receive signal strength indicator (RSSI) data values associated with each respective radio-frequency identification RFID tag from among a set of RFID tags located within a monitored environment: calculate an energy of frequency components of the time-varying RSSI data values; calculate an RFID tag energy summation characterization based upon a summation of the energy of the frequency components of the time-varying RSSI data values that are less than a threshold frequency; and calculate a motion confidence level metric indicative of a probability that the respective RFID tag was subjected to physical movement during a span of time corresponding to the time-varying RSSI data values based upon the RFID tag energy summation characterization.

In Example 10, the subject matter of Example 9, wherein the one or more processors are further configured to calculate the motion confidence level metric based upon a classification of the RFID tag energy summation characterization in accordance with a predetermined trained motion model of energy of frequency components of moving RFID tags within the monitored environment.

In Example 11, the subject matter of any combination of Examples 9-10, wherein the one or more processors are configured to selectively process, based upon the motion confidence level metric, each series of time-varying RSSI data values associated with a respective RFID tag from among the set of RFID tags to calculate a probability with respect to an expected variation of the respective time-varying RSSI data values associated with each respective RFID tag, wherein an increased probability is indicative of a higher likelihood of an RFID tag being subjected to physical movement.

In Example 12, the subject matter of any combination of Examples 9-11, wherein the one or more processors are configured to process each series of time-varying RSSI data values associated with a respective RFID tag from among the set of RFID tags when a number of the set of RFID tags exceeding a threshold RFID tag number have a motion confidence level metric value that is less than a confidence level metric threshold number.

In Example 13, the subject matter of any combination of Examples 9-12, wherein the one or more processors are configured to process each series of time-varying RSSI data values associated with a respective RFID tag from among the set of RFID tags when the a number of the set of RFID tags located within the monitored environment exceeds a threshold RFID tag number.

In Example 14, the subject matter of any combination of Examples 9-13, wherein the set of RFID tags are from among a plurality of RFID tags within the monitored environment, and wherein the one or more processors are configured to: perform an RSSI baselining procedure during a period of time in which the plurality of RFID tags within the monitored environment are static; and calculate, for each one of a set of regions within the monitored environment, a probability density function (pdf) with respect to RSSI data value variations of RFID tags located within each respective one of the regions over the period of time.

In Example 15, the subject matter of any combination of Examples 9-14, wherein the set of RFID tags are associated with the same region within the monitored environment, and wherein the one or more processors are further configured to calculate the probability of the expected variation of the time-varying RSSI data values associated with the set of RFID tags using the pdf associated with the region occupied by the set of RFID tags within the monitored environment.

In Example 16, the subject matter of any combination of Examples 9-15, wherein the one or more processors are configured to selectively process each series of time-varying RSSI data values associated with a respective RFID tag from among the set of RFID tags further based upon an identification of an occlusion zone corresponding to a physical location of the set of RFID tags within the monitored environment, wherein the occlusion zone is identified based upon sensor data indicating that a number of objects exceeding a threshold number in the proximity of the RFID tags during a time period corresponding to the time-varying RSSI data values.

Example 17 is a computer-readable media associated with a computing device having instructions stored thereon that, when executed by one or more processors, cause the computing device to, for a series of time-varying receive signal strength indicator (RSSI) data values associated with each respective radio-frequency identification (RFID) tag from among a set of RFID tags located within a monitored environment: calculate an energy of frequency components of the time-varying RSSI data values; calculate an RFID tag energy summation characterization based upon a summation of the energy of the frequency components of the time-varying RSSI data values that are less than a threshold frequency; and calculate a motion confidence level metric indicative of a probability that the respective RFID tag was subjected to physical movement during a span of time corresponding to the time-varying RSSI data values based upon the RFID tag energy summation characterization.

In Example 18, the subject matter of Example 17, wherein the computer-readable media further includes instructions that, when executed by one or more processors, further cause the computing device to calculate the motion confidence level metric based upon a classification of the RFID tag energy summation characterization in accordance with a predetermined trained motion model of energy of frequency components of moving RFID tags within the monitored environment.

In Example 19, the subject matter of any combination of Examples 17-18, wherein the computer-readable media further includes instructions that, when executed by one or more processors, cause the computing device to selectively process, based upon the motion confidence level metric, each series of time-varying RSSI data values associated with a respective RFID tag from among the set of RFID tags to calculate a probability with respect to an expected variation of the respective time-varying RSSI data values associated with each respective RFID tag, wherein an increased probability is indicative of a higher likelihood of an RFID tag being subjected to physical movement.

In Example 20, the subject matter of any combination of Examples 17-19, wherein the computer-readable media further includes instructions that, when executed by one or more processors, cause the computing device to process each series of time-varying RSSI data values associated with a respective RFID tag from among the set of RFID tags when a number of the set of RFID tags exceeding a threshold RFID tag number have a motion confidence level metric value that is less than a confidence level metric threshold number.

In Example 21, the subject matter of any combination of Examples 17-20, wherein the computer-readable media further includes instructions that, when executed by one or more processors, cause the computing device to process each series of time-varying RSSI data values associated with a respective RFID tag from among the set of RFID tags when the a number of the set of RFID tags located within the monitored environment exceeds a threshold RFID tag number.

In Example 22, the subject matter of any combination of Examples 17-21, wherein the set of RFID tags are from among a plurality of RFID tags within the monitored environment, and wherein the computer-readable media further includes instructions that, when executed by one or more processors, cause the computing device to: perform an RSSI baselining procedure during a period of time in which the plurality of RFID tags within the monitored environment are static; and calculate, for each one of a set of regions within the monitored environment, a probability density function (pdf) with respect to RSSI data value variations of RFID tags located within each respective one of the regions over the period of time.

In Example 23, the subject matter of any combination of Examples 17-22, wherein the set of RFID tags are associated with the same region within the monitored environment, and wherein the computer-readable media further includes instructions that, when executed by one or more processors, cause the computing device to calculate the probability of the expected variation of the time-varying RSSI data values associated with the set of RFID tags using the pdf associated with the region occupied by the set of RFID tags within the monitored environment.

In Example 24, the subject matter of any combination of Examples 17-23, wherein the computer-readable media further includes instructions that, when executed by one or more processors, cause the computing device to selectively process each series of time-varying RSSI data values associated with a respective RFID tag from among the set of RFID tags further based upon an identification of an occlusion zone corresponding to a physical location of the set of RFID tags within the monitored environment, wherein the occlusion zone is identified based upon sensor data indicating that a number of objects exceeding a threshold number in the proximity of the RFID tags during a time period corresponding to the time-varying RSSI data values.

Example 25 is a computing device, comprising: a communication means for receiving a series of time-varying receive signal strength indicator (RSSI) data values associated with each respective radio-frequency identification (RFID) tag from among a set of RFID tags located within a monitored environment; and a processing means for, for the series of time-varying RSSI data values associated with each respective RFID tag from among the set of RFID tags: calculating an energy of frequency components of the time-varying RSSI data values; calculating an RFID tag energy summation characterization based upon a summation of the energy of the frequency components of the time-varying RSSI data values that are less than a threshold frequency; and calculating a motion confidence level metric indicative of a probability that the respective RFID tag was subjected to physical movement during a span of time corresponding to the time-varying RSSI data values based upon the RFID tag energy summation characterization.

In Example 26, the subject matter of Example 25, wherein the processing means further calculates the motion confidence level metric based upon a classification of the RFID tag energy summation characterization in accordance with a predetermined trained motion model of energy of frequency components of moving RFID tags within the monitored environment.

In Example 27, the subject matter of any combination of Examples 25-26, wherein the processing means selectively processes, based upon the motion confidence level metric, each series of time-varying RSSI data values associated with a respective RFID tag from among the set of RFID tags to calculate a probability with respect to an expected variation of the respective time-varying RSSI data values associated with each respective RFID tag, wherein an increased probability is indicative of a higher likelihood of an RFID tag being subjected to physical movement.

In Example 28, the subject matter of any combination of Examples 25-27, wherein the processing means processes each series of time-varying RSSI data values associated with a respective RFID tag from among the set of RFID tags when a number of the set of RFID tags exceeding a threshold RFID tag number have a motion confidence level metric value that is less than a confidence level metric threshold number.

In Example 29, the subject matter of any combination of Examples 25-28, wherein the processing means processes each series of time-varying RSSI data values associated with a respective RFID tag from among the set of RFID tags when the a number of the set of RFID tags located within the monitored environment exceeds a threshold RFID tag number.

In Example 30, the subject matter of any combination of Examples 25-29, wherein the set of RFID tags are from among a plurality of RFID tags within the monitored environment, and wherein the processing means: performs an RSSI baselining procedure during a period of time in which the plurality of RFID tags within the monitored environment are static; and calculates, for each one of a set of regions within the monitored environment, a probability density function (pdf) with respect to RSSI data value variations of RFID tags located within each respective one of the regions over the period of time.

In Example 31, the subject matter of any combination of Examples 25-30, wherein the set of RFID tags are associated with the same region within the monitored environment, and wherein the processing means further calculates the probability of the expected variation of the time-varying RSSI data values associated with the set of RFID tags using the pdf associated with the region occupied by the set of RFID tags within the monitored environment.

In Example 32, the subject matter of any combination of Examples 25-31, wherein the processing means selectively processes each series of time-varying RSSI data values associated with a respective RFID tag from among the set of RFID tags further based upon an identification of an occlusion zone corresponding to a physical location of the set of RFID tags within the monitored environment, wherein the occlusion zone is identified based upon sensor data indicating that a number of objects exceeding a threshold number in the proximity of the RFID tags during a time period corresponding to the time-varying RSSI data values.

Example 33 is a computing device, comprising: a memory storing instructions thereon; and one or more processor means for executing the instructions stored in the memory to, for a series of time-varying receive signal strength indicator (RSSI) data values associated with each respective radio-frequency identification RFID tag from among a set of RFID tags located within a monitored environment: calculate an energy of frequency components of the time-varying RSSI data values; calculate an RFID tag energy summation characterization based upon a summation of the energy of the frequency components of the time-varying RSSI data values that are less than a threshold frequency; and calculate a motion confidence level metric indicative of a probability that the respective RFID tag was subjected to physical movement during a span of time corresponding to the time-varying RSSI data values based upon the RFID tag energy summation characterization.

In Example 34, the subject matter of Example 33, wherein the one or more processor means further calculate the motion confidence level metric based upon a classification of the RFID tag energy summation characterization in accordance with a predetermined trained motion model of energy of frequency components of moving RFID tags within the monitored environment.

In Example 35, the subject matter of any combination of Examples 33-34, wherein the one or more processor means selectively process, based upon the motion confidence level metric, each series of time-varying RSSI data values associated with a respective RFID tag from among the set of RFID tags to calculate a probability with respect to an expected variation of the respective time-varying RSSI data values associated with each respective RFID tag, wherein an increased probability is indicative of a higher likelihood of an RFID tag being subjected to physical movement.

In Example 36, the subject matter of any combination of Examples 33-35, wherein the one or more processor means process each series of time-varying RSSI data values associated with a respective RFID tag from among the set of RFID tags when a number of the set of RFID tags exceeding a threshold RFID tag number have a motion confidence level metric value that is less than a confidence level metric threshold number.

In Example 37, the subject matter of any combination of Examples 33-36, wherein the one or more processor means process each series of time-varying RSSI data values associated with a respective RFID tag from among the set of RFID tags when the a number of the set of RFID tags located within the monitored environment exceeds a threshold RFID tag number.

In Example 38, the subject matter of any combination of Examples 33-37, wherein the set of RFID tags are from among a plurality of RFID tags within the monitored environment, and wherein the one or more processor means: perform an RSSI baselining procedure during a period of time in which the plurality of RFID tags within the monitored environment are static; and calculate, for each one of a set of regions within the monitored environment, a probability density function (pdf) with respect to RSSI data value variations of RFID tags located within each respective one of the regions over the period of time.

In Example 39, the subject matter of any combination of Examples 33-38, wherein the set of RFID tags are associated with the same region within the monitored environment, and wherein the one or more processor means further calculate the probability of the expected variation of the time-varying RSSI data values associated with the set of RFID tags using the pdf associated with the region occupied by the set of RFID tags within the monitored environment.

In Example 40, the subject matter of any combination of Examples 33-39, wherein the one or more processor means selectively process each series of time-varying RSSI data values associated with a respective RFID tag from among the set of RFID tags further based upon an identification of an occlusion zone corresponding to a physical location of the set of RFID tags within the monitored environment, wherein the occlusion zone is identified based upon sensor data indicating that a number of objects exceeding a threshold number in the proximity of the RFID tags during a time period corresponding to the time-varying RSSI data values.

Example 41 is a computer-readable media associated with a computing device having instructions stored thereon that, when executed by one or more processor means, cause the computing device to, for a series of time-varying receive signal strength indicator (RSSI) data values associated with each respective radio-frequency identification (RFID) tag from among a set of RFID tags located within a monitored environment: calculate an energy of frequency components of the time-varying RSSI data values; calculate an RFID tag energy summation characterization based upon a summation of the energy of the frequency components of the time-varying RSSI data values that are less than a threshold frequency; and calculate a motion confidence level metric indicative of a probability that the respective RFID tag was subjected to physical movement during a span of time corresponding to the time-varying RSSI data values based upon the RFID tag energy summation characterization.

In Example 42, the subject matter of Example 41, wherein the computer-readable media further includes instructions that, when executed by the one or more processor means, further cause the computing device to calculate the motion confidence level metric based upon a classification of the RFID tag energy summation characterization in accordance with a predetermined trained motion model of energy of frequency components of moving RFID tags within the monitored environment.

In Example 43, the subject matter of any combination of Examples 41-42, wherein the computer-readable media further includes instructions that, when executed by the one or more processor means, cause the computing device to selectively process, based upon the motion confidence level metric, each series of time-varying RSSI data values associated with a respective RFID tag from among the set of RFID tags to calculate a probability with respect to an expected variation of the respective time-varying RSSI data values associated with each respective RFID tag, wherein an increased probability is indicative of a higher likelihood of an RFID tag being subjected to physical movement.

In Example 44, the subject matter of any combination of Examples 41-43, wherein the computer-readable media further includes instructions that, when executed by the one or more processor means, cause the computing device to process each series of time-varying RSSI data values associated with a respective RFID tag from among the set of RFID tags when a number of the set of RFID tags exceeding a threshold RFID tag number have a motion confidence level metric value that is less than a confidence level metric threshold number.

In Example 45, the subject matter of any combination of Examples 41-44, wherein the computer-readable media further includes instructions that, when executed by the one or more processor means, cause the computing device to process each series of time-varying RSSI data values associated with a respective RFID tag from among the set of RFID tags when the a number of the set of RFID tags located within the monitored environment exceeds a threshold RFID tag number.

In Example 46, the subject matter of any combination of Examples 41-45, wherein the set of RFID tags are from among a plurality of RFID tags within the monitored environment, and wherein the computer-readable media further includes instructions that, when executed by the one or more processor means, cause the computing device to: perform an RSSI baselining procedure during a period of time in which the plurality of RFID tags within the monitored environment are static; and calculate, for each one of a set of regions within the monitored environment, a probability density function (pdf) with respect to RSSI data value variations of RFID tags located within each respective one of the regions over the period of time.

In Example 47, the subject matter of any combination of Examples 41-46, wherein the set of RFID tags are associated with the same region within the monitored environment, and wherein the computer-readable media further includes instructions that, when executed by the one or more processor means, cause the computing device to calculate the probability of the expected variation of the time-varying RSSI data values associated with the set of RFID tags using the pdf associated with the region occupied by the set of RFID tags within the monitored environment.

In Example 48, the subject matter of any combination of Examples 41-47, wherein the computer-readable media further includes instructions that, when executed by the one or more processor means, cause the computing device to selectively process each series of time-varying RSSI data values associated with a respective RFID tag from among the set of RFID tags further based upon an identification of an occlusion zone corresponding to a physical location of the set of RFID tags within the monitored environment, wherein the occlusion zone is identified based upon sensor data indicating that a number of objects exceeding a threshold number in the proximity of the RFID tags during a time period corresponding to the time-varying RSSI data values.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:
 a communication interface configured to receive a series of time-varying receive signal strength indicator (RSSI) data values associated with each respective radio-frequency identification (RFID) tag from among a set of RFID tags located within a monitored environment; and
 processing circuitry configured to, for the series of time-varying RSSI data values associated with each respective RFID tag from among the set of RFID tags:
  calculate an energy of frequency components of the series of time-varying RSSI data values;
  calculate an RFID tag energy summation characterization based upon a summation of the energy of the frequency components of the series of time-varying RSSI data values that are less than a threshold frequency value that indicates that variations in the time-varying RSSI data values correspond to physical movement of the respective RFID tag;
  calculate, based upon the RFID tag energy summation characterization, a motion confidence level metric indicative of a probability that the respective RFID tag was subjected to physical movement during a span of time corresponding to the series of time-varying RSSI data values; and
  provide, to a data analytics platform, the motion confidence level metric as part of an analytical dataset to enable the data analytics platform to determine which of the set of RFID tags were subjected to physical movement due to user interaction.

2. The computing device of claim 1, wherein the processing circuitry is further configured to calculate the motion confidence level metric based upon a classification of the RFID tag energy summation characterization in accordance with a predetermined trained motion model of energy of frequency components of moving RFID tags within the monitored environment.

3. The computing device of claim 1, wherein the processing circuitry is configured to selectively process, based upon the motion confidence level metric, each series of time-varying RSSI data values associated with a respective RFID tag from among the set of RFID tags to calculate a probability with respect to an expected variation of the respective series of time-varying RSSI data values associated with each respective RFID tag, and
 wherein an increased probability is indicative of a higher likelihood of an RFID tag being subjected to physical movement.

4. The computing device of claim 3, wherein the processing circuitry is configured to process each series of time-varying RSSI data values associated with a respective RFID tag from among the set of RFID tags when a number of the set of RFID tags exceeding a threshold RFID tag number have a motion confidence level metric value that is less than a confidence level metric threshold number.

5. The computing device of claim 3, wherein the processing circuitry is configured to process each series of time-varying RSSI data values associated with a respective RFID tag from among the set of RFID tags when a number of the set of RFID tags located within the monitored environment exceeds a threshold RFID tag number.

6. The computing device of claim 3, wherein the set of RFID tags are from among a plurality of RFID tags within the monitored environment, and wherein the processing circuitry is configured to:
 perform an RSSI baselining procedure during a period of time in which the plurality of RFID tags within the monitored environment are static; and
 calculate, for each one of a set of regions within the monitored environment, a probability density function (pdf) with respect to RSSI data value variations of RFID tags located within each respective one of the regions over the period of time.

7. The computing device of claim 6, wherein the set of RFID tags are associated with the same region within the monitored environment, and
 wherein the processing circuitry is further configured to calculate the probability of the expected variation of the time-varying RSSI data values associated with the set of RFID tags using the pdf associated with the region occupied by the set of RFID tags within the monitored environment.

8. The computing device of claim 3, wherein the processing circuitry is configured to selectively process each series of time-varying RSSI data values associated with a respective RFID tag from among the set of RFID tags further based upon an identification of an occlusion zone corresponding to a physical location of the set of RFID tags within the monitored environment, and
 wherein the occlusion zone is identified based upon sensor data indicating that a number of objects exceed a threshold number in the-a proximity of the RFID tags during a time period corresponding to the series of time-varying RSSI data values.

9. A computing device, comprising:
 a memory storing instructions thereon; and
 one or more processors configured to execute the instructions stored in the memory to, for a series of time-varying receive signal strength indicator (RSSI) data values associated with each respective radio-frequency identification RFID tag from among a set of RFID tags located within a monitored environment:
  calculate an energy of frequency components of the series of time-varying RSSI data values;

calculate an RFID tag energy summation characterization based upon a summation of the energy of the frequency components of the series of time-varying RSSI data values that are less than a threshold frequency value that indicates that variations in the time-varying RSSI data values correspond to physical movement of the respective RFID tag;

calculate a motion confidence level metric indicative of a probability that the respective RFID tag was subjected to physical movement during a span of time corresponding to the series of time-varying RSSI data values based upon the RFID tag energy summation characterization; and provide, to a data analytics platform, the motion confidence level metric as part of an analytical dataset to enable the data analytics platform to determine which of the set of RFID tags were subjected to physical movement due to user interaction.

10. The computing device of claim 9, wherein the one or more processors are further configured to calculate the motion confidence level metric based upon a classification of the RFID tag energy summation characterization in accordance with a predetermined trained motion model of energy of frequency components of moving RFID tags within the monitored environment.

11. The computing device of claim 9, wherein the one or more processors are configured to selectively process, based upon the motion confidence level metric, each series of time-varying RSSI data values associated with a respective RFID tag from among the set of RFID tags to calculate a probability with respect to an expected variation of the respective series of time-varying RSSI data values associated with each respective RFID tag, and wherein an increased probability is indicative of a higher likelihood of an RFID tag being subjected to physical movement.

12. The computing device of claim 11, wherein the one or more processors are configured to process each series of time-varying RSSI data values associated with a respective RFID tag from among the set of RFID tags when a number of the set of RFID tags exceeding a threshold RFID tag number have a motion confidence level metric value that is less than a confidence level metric threshold number.

13. The computing device of claim 11, wherein the one or more processors are configured to process each series of time-varying RSSI data values associated with a respective RFID tag from among the set of RFID tags when a number of the set of RFID tags located within the monitored environment exceeds a threshold RFID tag number.

14. The computing device of claim 11, wherein the set of RFID tags are from among a plurality of RFID tags within the monitored environment, and wherein the one or more processors are configured to:

perform an RSSI baselining procedure during a period of time in which the plurality of RFID tags within the monitored environment are static; and calculate, for each one of a set of regions within the monitored environment, a probability density function (pdf) with respect to RSSI data value variations of RFID tags located within each respective one of the regions over the period of time.

15. The computing device of claim 14, wherein the set of RFID tags are associated with the same region within the monitored environment, and wherein the one or more processors are further configured to calculate the probability of the expected variation of the series of time-varying RSSI data values associated with the set of RFID tags using the pdf associated with the region occupied by the set of RFID tags within the monitored environment.

16. The computing device of claim 11, wherein the one or more processors are configured to selectively process each series of time-varying RSSI data values associated with a respective RFID tag from among the set of RFID tags further based upon an identification of an occlusion zone corresponding to a physical location of the set of RFID tags within the monitored environment, wherein the occlusion zone is identified based upon sensor data indicating that a number of objects exceed a threshold number in a proximity of the RFID tags during a time period corresponding to the time-varying RSSI data values.

17. A non-transitory computer-readable media associated with a computing device having instructions stored thereon that, when executed by one or more processors, cause the computing device to, for a series of time-varying receive signal strength indicator (RSSI) data values associated with each respective radio-frequency identification (RFID) tag from among a set of RFID tags located within a monitored environment:

calculate an energy of frequency components of the series of time-varying RSSI data values;

calculate an RFID tag energy summation characterization based upon a summation of the energy of the frequency components of the series of time-varying RSSI data values that are less than a threshold frequency value that indicates that variations in the time-varying RSSI data values correspond to physical movement of the respective RFID tag; and calculate a motion confidence level metric indicative of a probability that the respective RFID tag was subjected to physical movement during a span of time corresponding to the series of time-varying RSSI data values based upon the RFID tag energy summation characterization; and provide, to a data analytics platform, the motion confidence level metric as part of an analytical dataset to enable the data analytics platform to determine which of the set of RFID tags were subjected to physical movement due to user interaction.

18. The non-transitory computer-readable media of claim 17, wherein the computer-readable media further includes instructions that, when executed by one or more processors, further cause the computing device to calculate the motion confidence level metric based upon a classification of the RFID tag energy summation characterization in accordance with a predetermined trained motion model of energy of frequency components of moving RFID tags within the monitored environment.

19. The non-transitory computer-readable media of claim 17, wherein the computer-readable media further includes instructions that, when executed by one or more processors, cause the computing device to selectively process, based upon the motion confidence level metric, each series of time-varying RSSI data values associated with a respective RFID tag from among the set of RFID tags to calculate a probability with respect to an expected variation of the respective series of time-varying RSSI data values associated with each respective RFID tag, and wherein an increased probability is indicative of a higher likelihood of an RFID tag being subjected to physical movement.

20. The non-transitory computer-readable media of claim 19, wherein the computer-readable media further includes instructions that, when executed by one or more processors, cause the computing device to process each series of time-varying RSSI data values associated with a respective RFID tag from among the set of RFID tags when a number of the set of RFID tags exceeding a threshold RFID tag number have a motion confidence level metric value that is less than a confidence level metric threshold number.

21. The non-transitory computer-readable media of claim 19, wherein the computer-readable media further includes instructions that, when executed by one or more processors, cause the computing device to process each series of time-varying RSSI data values associated with a respective RFID tag from among the set of RFID tags when a number of the set of RFID tags located within the monitored environment exceeds a threshold RFID tag number.

22. The non-transitory computer-readable media of claim 19, wherein the set of RFID tags are from among a plurality of RFID tags within the monitored environment, and wherein the computer-readable media further includes instructions that, when executed by one or more processors, cause the computing device to:
 perform an RSSI baselining procedure during a period of time in which the plurality of RFID tags within the monitored environment are static; and
 calculate, for each one of a set of regions within the monitored environment, a probability density function (pdf) with respect to RSSI data value variations of RFID tags located within each respective one of the regions over the period of time.

23. The non-transitory computer-readable media of claim 22, wherein the set of RFID tags are associated with the same region within the monitored environment, and
 wherein the computer-readable media further includes instructions that, when executed by one or more processors, cause the computing device to calculate the probability of the expected variation of the series of time-varying RSSI data values associated with the set of RFID tags using the pdf associated with the region occupied by the set of RFID tags within the monitored environment.

24. The non-transitory computer-readable media of claim 19, wherein the computer-readable media further includes instructions that, when executed by one or more processors, cause the computing device to selectively process each series of time-varying RSSI data values associated with a respective RFID tag from among the set of RFID tags further based upon an identification of an occlusion zone corresponding to a physical location of the set of RFID tags within the monitored environment,
 wherein the occlusion zone is identified based upon sensor data indicating that a number of objects exceed a threshold number in the-a proximity of the RFID tags during a time period corresponding to the series of time-varying RSSI data values.

\* \* \* \* \*